US006407656B1

(12) United States Patent
Konda et al.

(10) Patent No.: US 6,407,656 B1
(45) Date of Patent: Jun. 18, 2002

(54) BREAKER DEVICE

(75) Inventors: Kazumoto Konda, Nagoya; Junji Muta, Yokkaichi; Tatsuya Sumida, Yokkaichi; Yoshito Oka, Yokkaichi; Ichiaki Sano, Nagoya, all of (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 111 days.

(21) Appl. No.: 09/639,934

(22) Filed: Aug. 17, 2000

(30) Foreign Application Priority Data

Aug. 18, 1999 (JP) ........................................... 11-231905
Aug. 18, 1999 (JP) ........................................... 11-231907
Aug. 19, 1999 (JP) ........................................... 11-233181

(51) Int. Cl.[7] ...................... H01H 85/044; H01H 85/25; H01H 85/48; H02H 3/08; H02H 1/18

(52) U.S. Cl. ....................... 337/194; 337/208; 337/186; 337/4; 361/104; 361/642

(58) Field of Search ............................... 337/1, 4, 5, 6, 337/9, 142, 186, 194, 208; 361/104, 626, 642, 646, 833, 835, 837; 307/112, 116, 125, 130, 131, 149; 340/509, 522, 540, 635, 652, 657, 660, 638, 639

(56) References Cited

U.S. PATENT DOCUMENTS

| | | | | | |
|---|---|---|---|---|---|
| 1,966,716 | A | * | 7/1934 | Green | 337/188 |
| 2,072,729 | A | | 3/1937 | Corbett | |
| 2,186,813 | A | * | 1/1940 | Adam et al. | 337/194 |
| 2,289,122 | A | * | 7/1942 | Jackson et al. | 337/139 |
| 2,636,096 | A | * | 4/1953 | Di Blasi | 337/189 |
| 3,030,474 | A | * | 4/1962 | Scott, Jr. | 337/146 |
| 3,202,788 | A | * | 8/1965 | George | 337/194 |
| 4,283,100 | A | * | 8/1981 | Griffin et al. | 361/823 |
| 4,733,028 | A | | 3/1988 | Flumignan | |
| 4,851,963 | A | * | 7/1989 | Miller et al. | 200/16 F |
| 5,072,081 | A | * | 12/1991 | Sepelak et al. | 218/151 |
| RE34,113 | E | * | 10/1992 | Miller et al. | 200/16 F |
| 5,399,103 | A | | 3/1995 | Kuboshima et al. | |
| 5,406,449 | A | * | 4/1995 | Hicks et al. | 200/304 |
| D367,041 | S | * | 2/1996 | Alfaro et al. | D13/160 |
| 5,559,662 | A | * | 9/1996 | Happ et al. | 337/265 |
| 5,831,228 | A | | 11/1998 | Kuki et al. | |
| 5,842,560 | A | | 12/1998 | Kuki et al. | |
| 5,847,338 | A | | 12/1998 | Kuki et al. | |
| 5,906,508 | A | * | 5/1999 | Jeffcoat | 200/308 |
| 5,973,418 | A | * | 10/1999 | Ciesielka et al. | 307/112 |
| 5,993,225 | A | * | 11/1999 | Johnson et al. | 439/136 |
| 6,317,312 | B1 | * | 11/2001 | Hashizawa et al. | 337/194 |
| 6,327,140 | B1 | * | 12/2001 | Hashizawa et al. | 337/194 |
| 6,333,845 | B1 | * | 12/2001 | Hashizawa et al. | 337/194 |

FOREIGN PATENT DOCUMENTS

| | | | | | |
|---|---|---|---|---|---|
| EP | 411216 | A1 | * | 2/1991 | H01R/27/00 |
| EP | 0790-677 | A2 | | 8/1997 | |
| FR | 2445009 | | | 7/1980 | |
| JP | 7-298430 | A | * | 11/1995 | H02B/11/133 |
| JP | 11-176507 | A | * | 7/1999 | H01R/13/44 |
| JP | A-11-252703 | | | 9/1999 | |

* cited by examiner

*Primary Examiner*—Anatoly Vortman
(74) *Attorney, Agent, or Firm*—Oliff & Berridge PLC

(57) ABSTRACT

In the breaker device, a pair of stationary electrodes 20, 21 are arranged on the front and the rear side of the protruding wall 18, that is, the pair of stationary electrodes 20, 21 are collected at one place. Therefore, the pair of stationary electrodes 20, 21 have a space round both the stationary electrodes in common. Accordingly, the size of the breaker device can be reduced. Further, when the radius of curvature of the continuity section 73 connecting the pinching pieces 71, 72 is made large, concentration of stress in the movable electrode 70 can be relieved. Therefore, the pinching forces of both the pinching pieces 71, 72 can be increased. Accordingly, it is possible to ensure a sufficiently high contact pressure between the movable electrode 70 and the stationary electrodes 20, 21.

9 Claims, 17 Drawing Sheets

BREAKER DEVICE

BACKGROUND OF THE INVENTION

1. Field of the Invention

The present invention relates to a breaker device used for changing over a power cable connected to a battery of an automobile between a state of continuity and a state of non-continuity.

2. Description of the Related Art

According to Japanese Patent Application No. 10-47920 applied by the present applicant, there is disclosed a structure in which the breaker device 1 and the fuse 4 are separately arranged in the middle of a power cable of an electric automobile as shown in FIG. 16.

On the other hand, according to Japanese Unexamined Patent Publication No. 9-223439, there is disclosed a structure in which the fuse 4 is accommodated in the breaker device 3 as shown in FIG. 17. In this breaker device 3, the fuse 4 is accommodated in the case body 5A, and two columnar electrodes 2, 2 rise from the bottom face of the case body 5A. On the cover 5B which covers an upper face open portion of the case body 5A, there are provided a pair of holes 6, 6 corresponding to the stationary electrodes 2, 2. When both cylindrical legs 8, 8 provided in the movable electrode 7 are inserted into these holes 6, 6, both the stationary electrodes 2, 2 and both the legs 8, 8 are engaged with each other, so that both the stationary electrodes 2, 2 can be electrically communicated with each other. Therefore, electrical wire "e" can be changed over from a state of non-continuity to a state of continuity.

In this connection, both the breaker devices 1, 3 described above have both advantages and disadvantages. Concerning the breaker device 1 shown in FIG. 16, the breaker device 1 is provided separately from the fuse 4. Therefore, the breaker device 1 shown in FIG. 16 is advantageous in that it is possible to reduce the size compared with a breaker device in which the breaker device and the fuse are integrated with each other into one body. However, this breaker device 1 shown in FIG. 16 is disadvantageous as follows. The fuse 4 can be exposed under the condition that the breaker device 1 is turned on. Therefore, for example, when an operator touches the fuse in the case of replacing the fuse, it is necessary for him to make sure that the breaker device 1 has already been turned off, that is, it is necessary for the operator to pay close attention to the fuse.

On the other hand, concerning the latter breaker device shown in FIG. 17, it is impossible to replace the fuse unless the movable electrode is disconnected and the breaker device 3 is turned off. Therefore, this breaker device is advantageous in that the breaker device 3 is necessarily turned off in the case of replacing the fuse. However, the breaker device 3 is composed in such a manner that the stationary electrodes 2, 2 are separately raised. Therefore, it is difficult to reduce the size of the breaker device. Further, since the movable electrode 7 and the stationary electrode 2 are connected with each other, the movable electrode must penetrate the cover 5B at two positions, which deteriorates the operation property.

Moreover, when the size of the breaker device is reduced, in order to enhance the reliability of contact of the stationary electrode with the movable electrode, it is necessary to ensure the contact pressure of the stationary electrode with the movable electrode.

SUMMARY OF THE INVENTION

The present invention has been accomplished in view of the above circumstances. It is an object of the present invention to provide a breaker device, the sizes of which is reduced, the contact pressure of the stationary electrode with the movable electrode of which can be ensured sufficiently high.

A first aspect of the invention provides a breaker device comprising: a pair of sheet-shaped stationary electrodes arranged on a front and a rear side of a protruding wall rising from a breaker body; recess-shaped plug to be attached to the protruding wall; and a movable electrode arranged in a recess of the plug into which the protruding wall proceeds, the movable electrode including a first and a second pinching piece respectively coming into contact with the stationary electrodes, the base end portions of which are connected with each other by a continuity section, wherein the continuity section rises from the base end portion of the first pinching piece toward the second pinching piece, and the continuity section on the second pinching piece side is gently curved so that it continues to the second pinching piece.

In the structure described in the first aspect of the invention, the pair of stationary electrodes are arranged on the front and the rear side of the protruding wall, that is, the pair of stationary electrodes are collected at one place. Therefore, the pair of stationary electrodes have a space round both the stationary electrodes in common. Accordingly, the size of the breaker device can be reduced. When the plug is attached to the protruding wall, the protruding wall is interposed between the first and the second pinching piece of the movable electrode accommodated in the plug, and each stationary electrode comes into contact with each pinching piece. In this case, it is enough that the plug is attached at one position. Therefore, compared with the conventional structure in which the plug is attached at two positions, the attaching work of the plug of this structure can be made simple.

In this connection, when the plug is attached to the protruding wall, both the pinching pieces are expanded by the protruding wall. As a specific example is shown in FIG. 10A, the continuity section for connecting both the pinching pieces rises from the base end portion of the first pinching piece (K1), and the continuity section on the second pinching piece (K2) side curves gently and continues to the second pinching piece (K2). Therefore, as a comparative structure is shown in FIG. 10B, compared with the structure in which the continuity section is symmetrically formed and the pinching pieces (K1, K2) are connected with each other, the radius of curvature of the continuity section in the structure of the present invention is decreased (shown by marks r1, r2 in the drawing). Accordingly, concentration of stress caused in the continuity section can be relieved. Due to the foregoing, pinching forces of both the pinching pieces can be increased. Accordingly, the contact pressure between the movable electrode and the stationary electrode can be ensured sufficiently high.

A second aspect of the invention provides a breaker device, wherein the recess in the plug is formed in such a manner that the inside of the recess is larger than the opening, end portions of the first and the second pinching piece of the moveable electrode come into contact with the opening edge of the recess when the first and the second pinching piece are in the natural condition so that the movable electrode can not be drawn out from the recess. Accordingly, it is possible to prevent the movable electrode from coming off.

A third aspect of the invention provides a breaker device, wherein a portion of the peripheral wall of the recess of the plug is formed and incorporated into the peripheral wall differently from other portions of the peripheral wall, and the movable electrode is capable of being accommodated into the recess from a portion into which the portion of the peripheral wall is incorporated.

A fourth aspect of the invention provides a breaker device comprising: a protruding wall rising from a base section of a breaker body; a pair of sheet-shaped stationary electrodes arranged on a front and a rear side of the protruding wall; a recess-shaped plug to be attached to the protruding wall; a U-shaped movable electrode accommodated in the plug, electrically communicating both the stationary electrodes by pinching the protruding wall from the front and the reverse face; a fuse accommodating section arranged inside a surrounding wall rising from the base section in parallel with the protruding wall, accommodating a fuse connected with one of the stationary electrodes; a cover covering an open face of the fuse accommodating section, capable of being engaged with the a surrounding wall; an engaging face formed in the plug, directed to the front of the attaching direction of the plug; and a cover movement restricting section provided on the cover, engaged with the engaging face of the cover under the condition that the cover is engaged with the protruding wall.

In the structure of the fourth aspect of the invention, a pair of stationary electrodes are arranged on the front and the rear side of the protruding wall, that is, a pair of stationary electrodes are collected at one place. Therefore, the pair of stationary electrodes have a space round both the stationary electrodes in common. Accordingly, the size of the breaker device can be reduced. When the plug is attached to the protruding wall, the protruding wall is pinched by the movable electrode accommodated in the plug. Therefore, both the stationary electrodes are electrically communicated with each other. In this case, it is enough that the plug is attached at one position. Therefore, compared with the conventional structure in which the plug is attached at two position, the attaching work of the plug of this structure can be made simple. In this connection, when the plug is attached to the protruding wall, the cover movement restricting section provided on the cover which covers the fuse accommodating section engages with the engaging face provided in the plug. Accordingly, unless the plug is pulled out, the cover can not be removed. In other words, when the fuse is replaced, the plug is necessarily disconnected and a state of non-continuity can be obtained.

A fifth aspect of the invention provides a breaker device, wherein the engaging face is arranged on the forward end side of the attaching direction of the plug, the cover movement restricting section is arranged at a lower end of a vertical wall extending downward along a side of the plug from a ceiling portion of the cover, and the cover movement restricting section is formed into a protruding piece protruding from the lower end of the vertical wall so that the cover movement restricting section is arranged along the engaging face of the plug.

According to the fifth aspect of the invention, the cover movement restricting section engages with the engaging face arranged on the forward end side of the plug in the attaching direction. Therefore, when the plug is disconnected halfway from the protruding wall, the cover movement restricting sections still engages with the engaging face, and the cover can not be disengaged from the fuse accommodating section. That is, unless the plug is completely disconnected from the protruding wall and the fuse is set in a state of complete non-continuity, the cover can not be disengaged from the fuse accommodating sections, and it becomes possible to prevent the fuse from being replaced in a state of continuity.

A sixth aspect of the invention provides a breaker device, wherein an engaging section to be engaged with the surrounding wall so as to restrict the cover from being disengaged is provided on the cover on a side distant from the plug.

According to the sixth aspect of the invention, both end portions of the cover are engaged with the engaging face of the plug and the engaging section of the surrounding wall of the breaker body. Therefore, it is possible to prevent the cover from being obliquely disengaged.

A seventh aspect of the invention provides a breaker device comprises: a pair of sheet-shaped stationary electrodes arranged on a front and a rear side of a protruding wall rising from a breaker body; and a portal-shaped movable electrode capable of short-circuiting the stationary electrodes, wherein when the movable electrode is attached to the protruding wall, lower end portions of a pair of leg pieces provided in the movable electrode, the interval of which is shortened, respectively come into contact with the stationary electrodes so that both the stationary electrodes can be changed over from a state of non-continuity to a state of continuity, and the protruding wall includes a lance extending downward from an upper end of the protruding wall in a cantilever-shape and preventing the stationary electrode from coming off when the lance is butted against a forward end face of the stationary electrode and the protruding wall also includes lance protection walls arranged adjacent to the lance on the protruding wall, for opening the leg pieces so that the leg pieces can not be contacted with the lance when the lower end portions of the leg pieces passes through the forward end side of the protruding wall.

In the breaker device according to an eighth aspect of the invention, the lance protection walls are formed into a pair, and the lance is arranged between both lance protection walls being formed into a pair.

According to the invention, a pair of stationary electrodes are arranged on the front and the reverse face of the protruding wall so as to collect the stationary electrodes. Therefore, the pair of stationary electrodes have a space round both the stationary electrodes in common. Accordingly, the size of the breaker device can be reduced. Since the stationary electrodes are prevented from coming off by the lances, there is no possibility that the stationary electrodes are pulled out upward by a friction force generated when the movable electrode is pulled out. Further, when the stationary electrode is incorporated being moved from the upper end side to the base end side of the protruding wall, the lance is pushed in the middle of movement by the stationary electrode and retracted from the path of the stationary electrode. Therefore, no lance obstructs the movement of the stationary electrode. Accordingly, the stationary electrode can be easily incorporated. Further, when the movable electrode is attached to and detached from the protruding wall, the lower end portions of the legs provided in the movable electrode are opened by the lance protection walls provided adjacent to the lances so that the lance can not be contacted with the movable electrode. Therefore, when the movable electrode is attached to and detached from the protruding wall, the lance is not deformed, and the stationary electrode can be stably held.

Concerning the lower end portions of the leg pieces provided in the movable electrode, both end portions in the width direction are held by a pair of lance protection walls in such a manner that both end portions are supported. Therefore, the leg pieces of the movable electrode can be positively prevented from coming into contact with the lances. Further, the lances are formed into a pair and butted against both side sections of the end of the stationary electrode. Therefore, they are positively prevented from coming off. Furthermore, compared with a case in which one wide lance is provided, the lance deformation reaction force can be suppressed.

DETAILED DESCRIPTION OF THE PRESENT INVENTION

First Embodiment

Referring to FIGS. 1 to 10B, an embodiment of the present invention will be explained as follows.

The breaker device of this embodiment is arranged in the middle of a power cable of an electric automobile and used for changing over the power cable between a state of continuity and a state of non-continuity.

Figure 1:
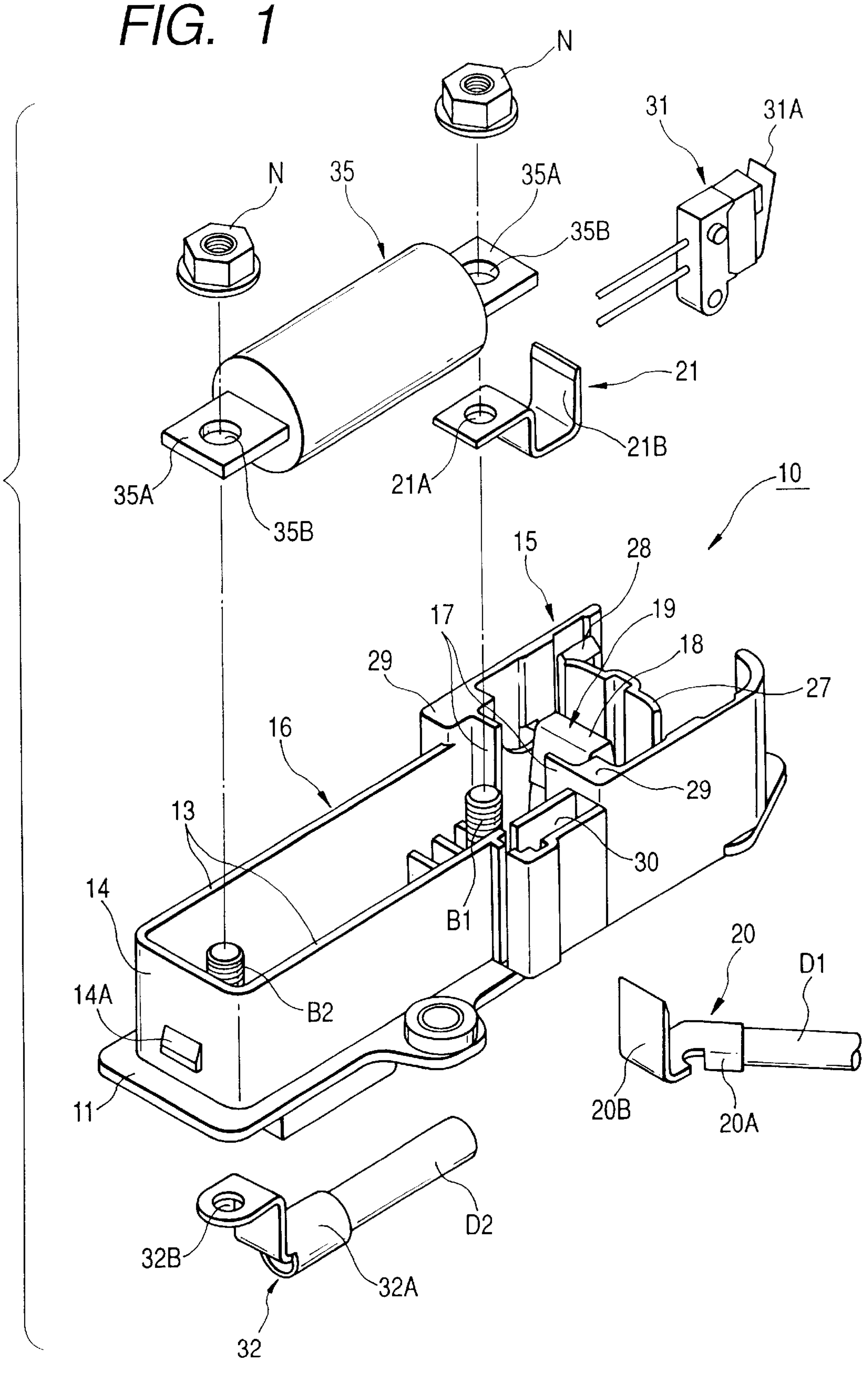
FIG. 1 is a perspective view showing a breaker device of an embodiment of the present invention.

As shown in FIG. 1, the shape of the breaker body 10 provided in this breaker device is formed in such a manner that a pair of long walls 13, 13 are extended in parallel with each other in the longitudinal direction of the flat-sheet-shaped base section 11, and these long walls 13, 13 are connected with each other at one end portion by the short wall 14 and open from each other at the other end portion. On the open side, an interval between the long walls 13, 13 is extended step-wise, and the plug accommodating section 15 is formed inside the long walls 13, 13, and further on the closed side, the fuse accommodating section 16 is formed which are surrounded by both the long walls 13, 13 and the short wall 14. The plug accommodating sections 15 and the fuse accommodating section 16 are separate from each other by the partition walls 17, 17 which are protruding from both the long walls 13, 13 in such a manner that they approach each other.

Figure 4:
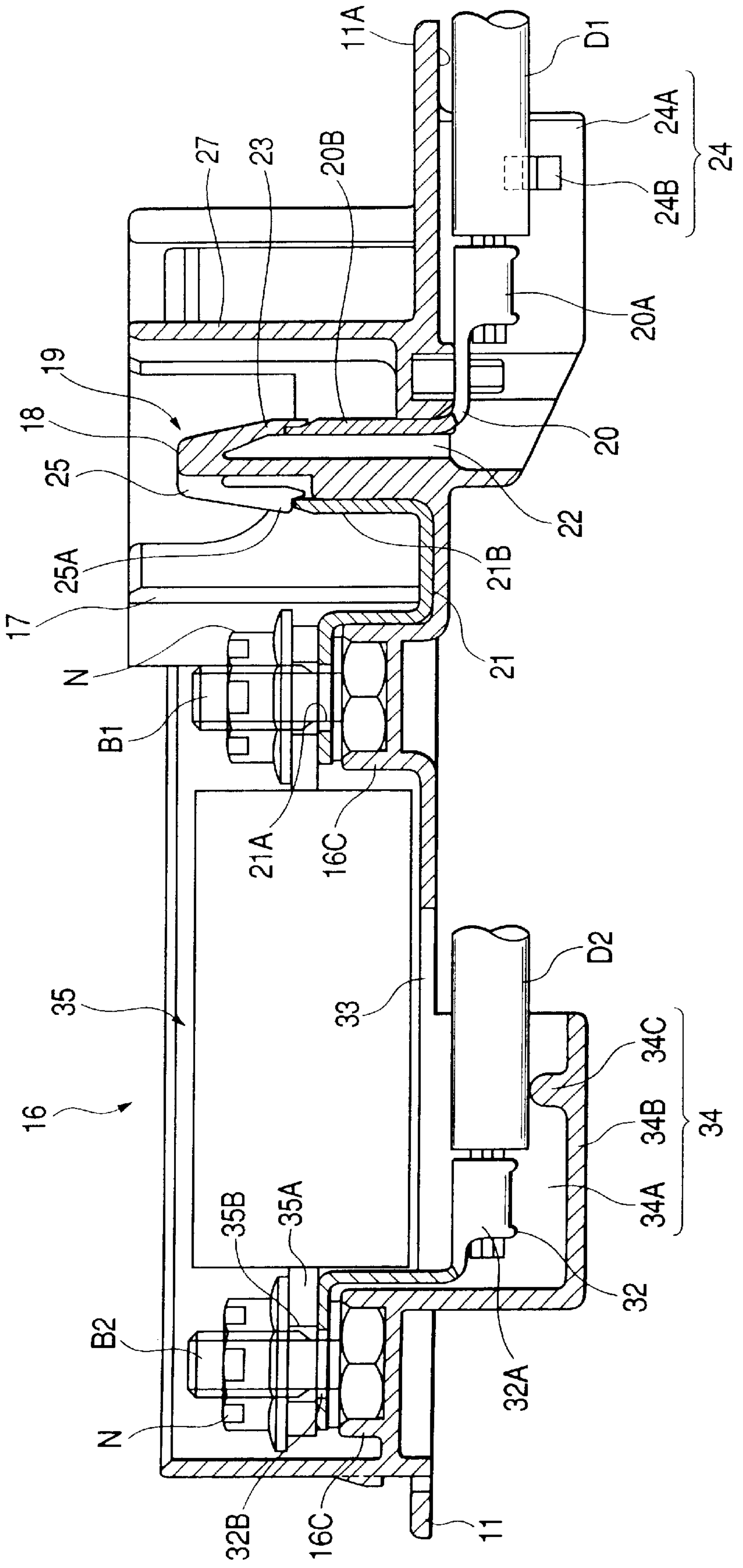
FIG. 4 is a cross-sectional side view showing a breaker body.

As shown in FIG. 4, the protruding wall 18 rises from the base section 11 at a position distant from the partition wall 17 in the plug accommodating section 15. The first 20 and the second stationary electrode 21 are respectively attached onto the front and the reverse side of the protruding wall 18 in the longitudinal direction (the traverse direction in FIG. 4) of the breaker body 10.

Specifically, on the surface 18A of the protruding wall 18 directed to the right in FIG. 4, the first stationary electrode 20 is arranged. This first stationary electrode 20 is composed in such a manner that a metal sheet is bent into an L-shape, and the barrel portion 20A is provided at its end portion, and further electrical wire D1 is attached to the barrel portion 20A with pressure. The end contact portion 20B on the opposite side to the barrel portion 20A of the first stationary electrode 20 enters the plug accommodating section 15 via the through-hole 22 from the reverse side of the base section 11 and is arranged on the base end side of the surface 18A of the protruding wall 18. The protrusion 23 is formed at the forward end side of the surface 18A of the protruding wall 18, and the forward end of the first stationary electrode 20 butts against the lower face of the protrusion 23.

On the other hand, on the reverse side 18B of the protruding wall 18 directed to the left in FIG. 4, the second stationary electrode 21 is arranged. This second stationary electrode 21 is composed in such a manner that a metal sheet is bent into a U-shape, and one side of the U-shape is bent outside at a right angle and the bolt through-hole 21A is formed at the end. The second stationary electrode 21 is pushed from the bottom side of the U-shape into between the partition wall 17 and the protruding wall 18, and the forward end contact portion 21B is arranged on the base end side of the reverse face 18B of the protruding wall 18. Bolt B1 described later arranged in the fuse accommodating section 16 penetrates the bolt through-hole 21A.

Figure 6A:
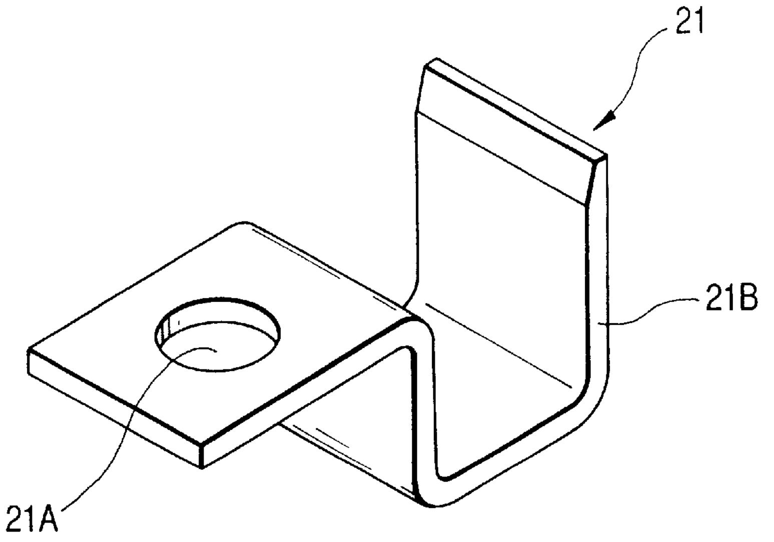
FIG. 6 is a perspective view showing a protruding wall and a stationary electrode.

As shown in FIG. 6, at the forward end side of the reverse face 18B of the protruding wall 18, there are provided a pair of lances 25, 25 for preventing the second stationary electrode 21 from coming off. These lances 25, 25 rise from the forward end portion of the protruding wall 18 and extend downward in parallel with each other, and the forward end portion of the second stationary electrode 21 is butted against the lower face of the engaging section 25A provided in the lower end portion as shown in FIG. 4. On both sides of the lance 25 on the reverse face 18B of the protruding wall 18, there are provided a pair of lance protection walls 26, 26 rising higher than the lance 25.

In the plug accommodating section 15, at a position more distant from the partition wall 17 than the protruding wall 18, as shown in FIG. 1, the end wall 27 rises from the base section 11. The plug 50 described later is attached to the forward end of the protrusion 18 being guided by this end wall 27.

Figure 5:
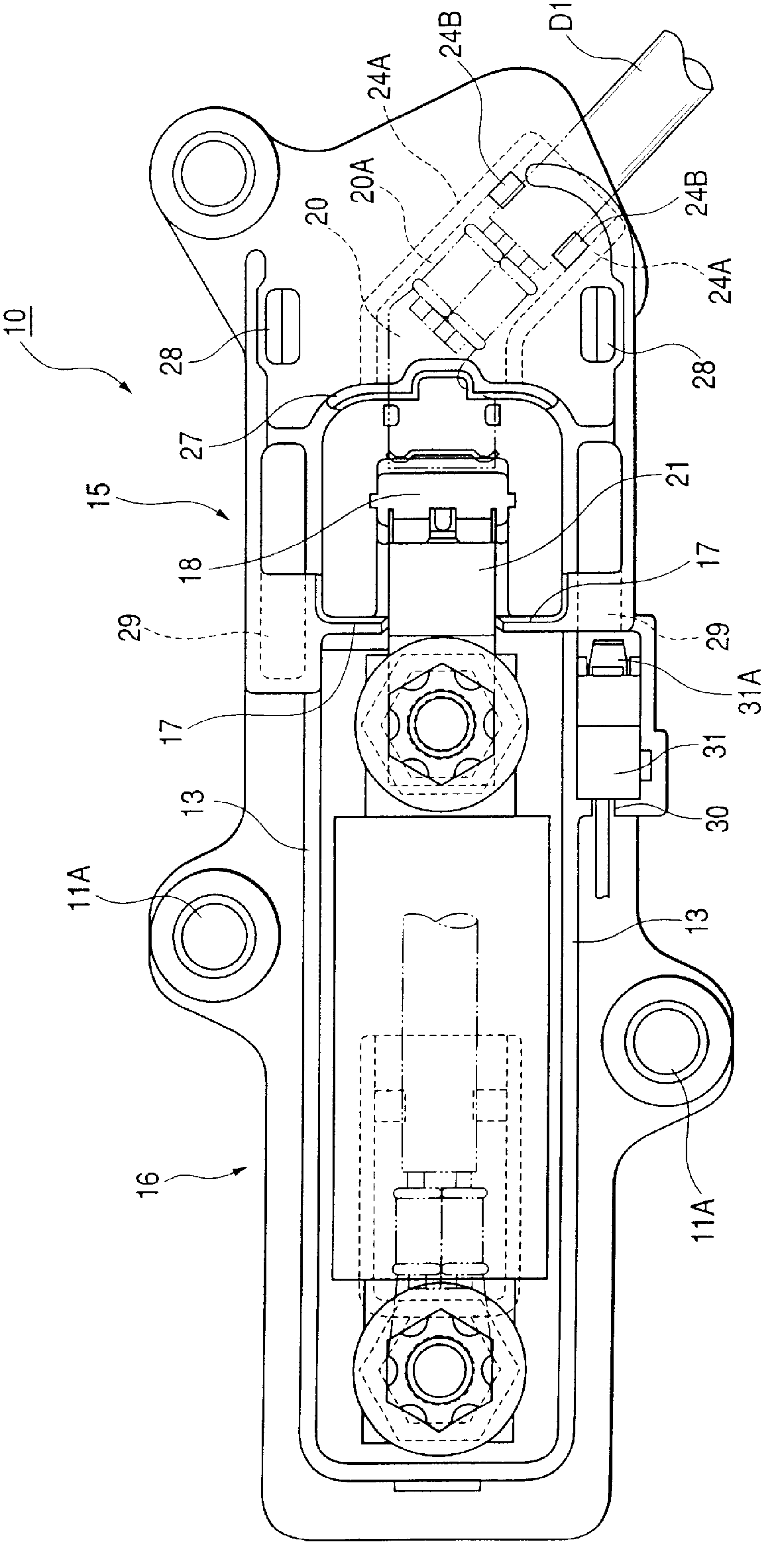
FIG. 5 is a plan view showing a breaker body.

In the plug accommodating section 15, at a position more distant from the partition wall 17 than the end wall 27, as shown in FIG. 5, the engaging pieces 28, 28 rise being adjacent to both the long walls 13, 13. An end of the lever 60 provided in the plug 50 is engaged with the engaging piece.

On the reverse side (the face directed downward in FIG. 4) of the base section 11 corresponding to the plug accommodating section 15, there is provided an electrical wire holding section 24 for holding electrical wire D extending from the first stationary electrode 20. The electrical wire holding section 24 is composed as follows. As shown in FIG. 5, electrical wire D is accommodated between a pair of opposing walls 24A, 24A which are hanging down from the reverse face of the base section 11 being opposed to each other, and electrical wire D is restricted by a pair of electrical wire engaging sections 24B, 24B, which protrude from the opposing walls 24A, 24A in the directions by which they approach each other, so that electrical wire D can not be freely moved downward. In this connection, in the electrical wire engaging protrusion 24B, there is provided an obliquely downward introducing face, by which electrical wire D1 can be easily pushed inside the electrical wire holding section 24.

In the step portions of the long walls 13, 13 formed in the boundary portion between the plug accommodating section 15 and the fuse accommodating section 16, as shown in FIG. 5, there are provided a pair of receiving sections 29, 29. These receiving sections 29, 29 are open in the longitudinal direction of the breaker body 10, and further the upper faces of these receiving sections 29, 29 are closed. In these receiving sections 29, 29, the end portion of the lever 60 provided in the plug 50 is accommodated. One of the receiving sections 29, 29 is communicated with the microswitch accommodating chamber 30, and the contact 31A of the microswitch 31 (shown in FIG. 1) accommodated in the microswitch accommodating chamber 30 can be turned on by the lever 60 which has entered the receiving section 29.

Next, the fuse accommodating section 16 will be explained below. As shown in FIG. 4, there are provided a pair of mount sections 16C, 16C are provided at both end portions in the longitudinal direction in such a manner that they rise from the base section 11. In these mount sections 16C, 16C, bolts B1, B2 made of metal are insert-formed in such a manner that the head portions of the bolts are embedded and the screw portions are raised upward. One bolt B1 on the plug accommodating section 15 side is inserted into the second stationary electrode 21, and the other bolt B2 is inserted into the terminal metal fitting 32.

This terminal metal fitting 32 is formed in such a manner that a metal sheet is bent into a crank-shape, and electrical wire D2 is fixed to the barrel section 32A arranged at one end of the terminal metal fitting. Under the condition that electrical wire D2 is inserted from the reverse side of the base section 11 into the fuse accommodating section 16 via the work hole 33 (shown in FIG. 4), bolt B2 is inserted into the bolt through-hole 32B arranged at the forward end of the terminal metal fitting 32. Electrical wire D2 is drawn outside from the work hole 33 and held by the electrical wire holding section 34 arranged on the reverse side of the base section 11.

As shown in FIG. 4, the electrical wire holding section 34 is composed as follows. Lower end edges of the pair of opposing walls 34A, 34A hanging down from both edge portions of the work hole 33 on the reverse side of the base section 11 are connected with each other by the bottom wall 34B, so that the electrical wire holding section 34 covers the major part of the work hole 33, and electrical wire D2 is prevented from hanging down by the protrusion 34C which protrudes upward from the bottom wall 34B.

The fuse 35 accommodated in the fuse accommodating section 16 is composed as follows. As shown in FIG. 1, the metallic protruding pieces 35A, 35A are protruded from both end portions of a columnar body, and circular holes 35B are respectively formed in the metallic protruding pieces 35A, 35A. Both bolts B1, B2 of the fuse accommodating section 16 are inserted into these circular holes 35B, and nuts N, N are fastened so as to fasten bolts B1, B2.

Figure 2:
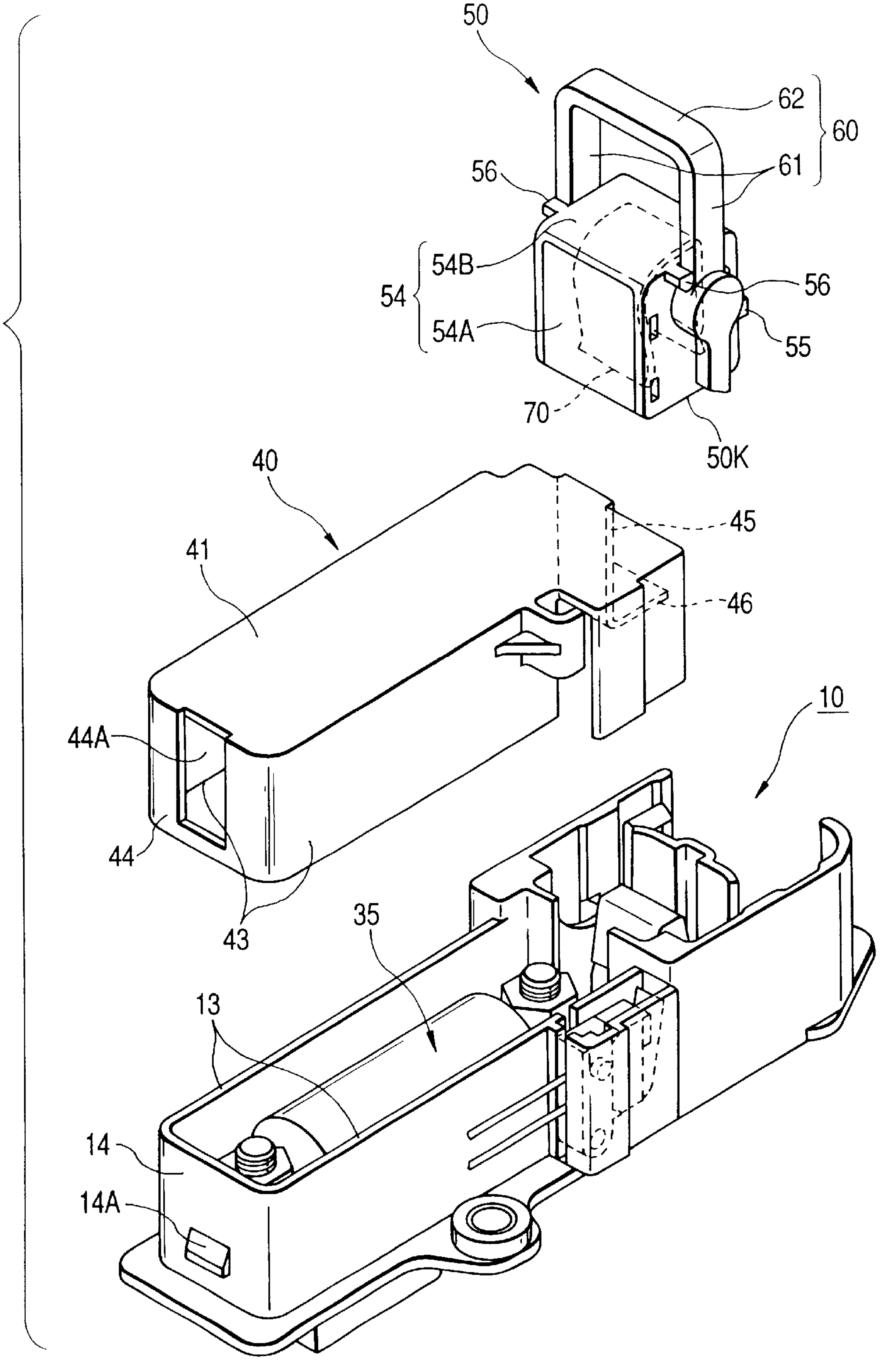
FIG. 2 is a perspective view showing a breaker device, the cover and the plug of which are disengaged from a breaker body.

The fuse accommodating section 16 is engaged with the cover 40 shown in FIG. 2. The shape of the cover 40 is composed as follows. There is provided a narrow ceiling wall 41 corresponding to the fuse accommodating section 16. On the lower face of the ceiling wall 41, a pair of long walls 43, 43 are extended in the longitudinal direction in parallel with each other. On one side, ends of the long walls 43, 43 are connected with each other by the short wall 44, and on the other sides, ends of the long walls 43, 43 are open. On the open end side, the rectangular vertical wall 45 hangs down from the ceiling wall 41, and the restricting protruding piece 46 is protruded from the end of the rectangular vertical wall 45 to the outside in the longitudinal direction of the cover 40.

Next, the plug 50 will be explained below. As shown in FIG. 2, the plug 50 includes a square tube type housing 54 having a bottom at one end, and the recess 51 (shown in FIG. 7) is open onto the lower face, and the portal type lever 60 is pivotally arranged on the outer face of the housing 54.

As shown in FIG. 2, the lever 60 includes a pair of arms 61, 61, and an end of one arm 61 and an end of the other arm 61 are connected with each other by the operating section 62, and the supports shafts 63, 63 (shown in FIG. 7) are protruded from the arms 61, 61 toward the housing 54. The support shafts 63, 63 are inserted into the shaft hole 63H (shown in FIG. 7) formed on both sides of the housing 54, so that the lever 60 can be rotated.

As shown in FIG. 2, on both sides of the housing 54, there are provided rotation restricting protruding sections 55, 56 for restricting the movable range of the lever 60. Due to the above structure, the lever 60 can be rotated only in the range of 90° between the rising posture shown in FIG. 7 and the horizontal posture shown in FIG. 8.

Figure 7:
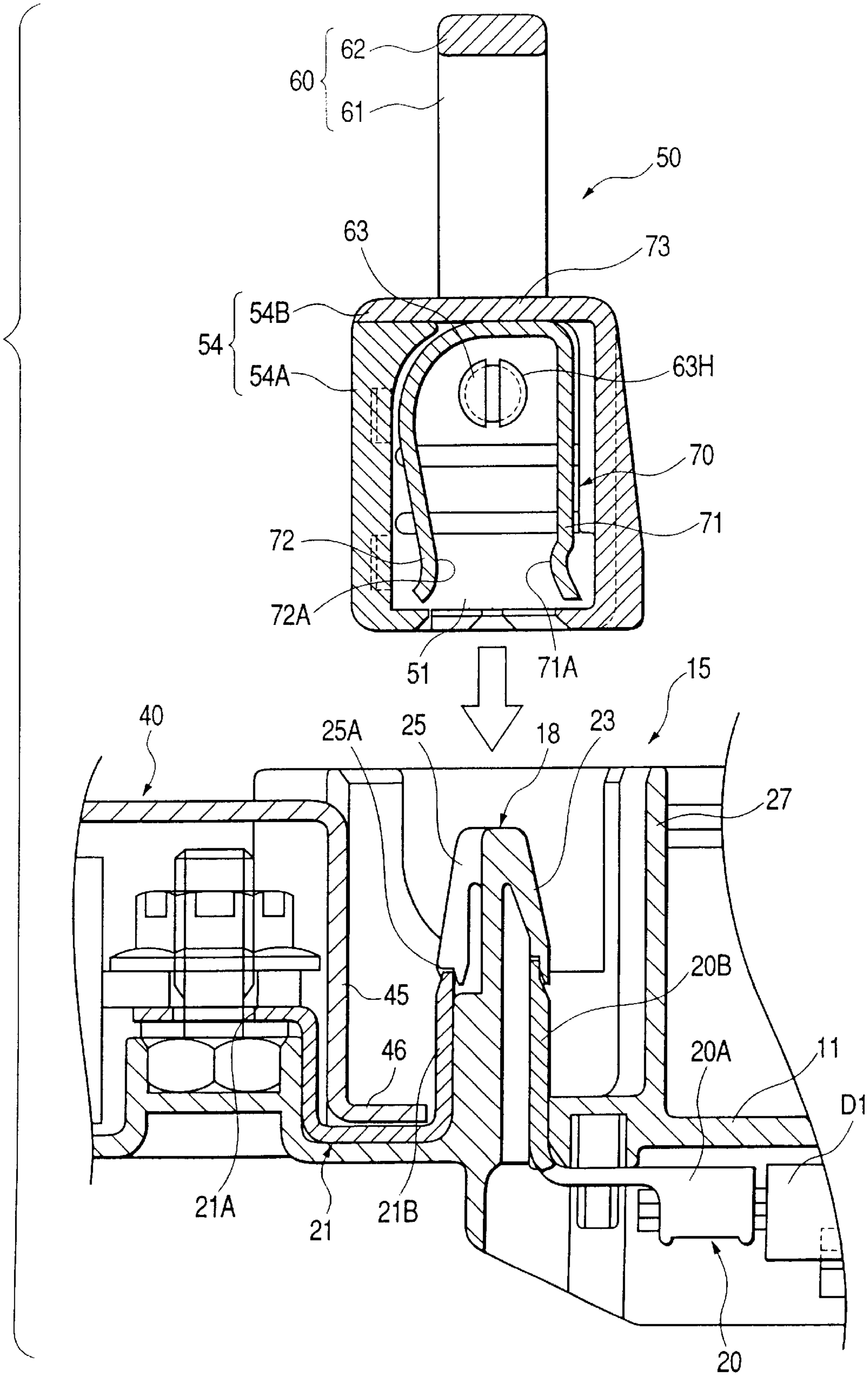
FIG. 7 is a cross-sectional side view showing a state before a plug is attached to a protruding wall.

As shown in FIG. 7, the housing 54 includes: a wall section 54A which composes a portion of the peripheral wall; and a main section 54B except for the wall section 54A, wherein the wall section 54A is differently formed from the main section 54B. Under the condition that this wall section 54A has not been attached to the main section 54B, the movable electrode 70 is accommodated into the recess 51 from the open section. After that, the open section is closed by the wall section 54A.

The recess 51 formed in the housing 54 is formed in such a manner that the inner portion is wider than the opening. Therefore, the lower end portion of the movable electrode 70 accommodated in the recess 51 is contacted with the opening edge of the recess 51 and prevented from coming off in the natural condition.

As shown in FIG. 7, the movable electrode 70 is composed in such a manner that the first 71 and the second pinching piece 72, which respectively come into contact with the stationary electrodes 20, 21 while the protruding wall 18 is interposed between the first 71 and the second pinching piece 72, are connected with each other by continuity section 73. Specifically, the movable electrode 70 is composed as follows. The first pinching piece 71 is formed straight, that is, the first pinching piece 71 extends straight along the inner face of the recess 51 of the housing 54. The continuity section 73 rises straight from the base end section (the upper end section shown in FIG. 7) of the first pinching piece 71 being bent by a right angle, and the second pinching piece 72 side of the continuity section 73 curves gently and continues to the second pinching piece 72. At the end portions of both the pinching pieces 71, 72, the contacts 71A, 72A are protruded in the directions so that they can approach each other.

The structure of the breaker device of this embodiment is explained above. The action of the breaker device will be explained below. This breaker device is attached to an electric automobile in the following manner. A portion of the power cable of the electric automobile is attached to the breaker body 10 as electrical wires D1, D2, and the breaker body 10 is fixed at a predetermined position of the electric automobile when a bolt is inserted into the attaching hole 11A (shown in FIG. 5) formed in the base section 11.

Next, the cover 40 is attached to the fuse accommodating section 16 of the breaker body 10. The cover 40 is pressed so that the long wall 43 and the short wall 44 can be respectively engaged with the outside of the long wall 13 and the short wall 14 of the breaker body 10. When the cover 40 is pressed, the engaging hole 44A formed on the short wall 44 of the cover 40 is engaged with the engaging protrusion 14A formed on the short wall 14 of the breaker body 10. At this moment, the vertical wall 45 provided on the cover 40 is inserted between a pair of partition walls 17, 17 arranged at one end of the fuse accommodating section 16. Further, the restricting protruding piece 46 is set at a position close to the rising portion of the protruding wall 18 of the base section 11 of the breaker body 10.

Figure 3:
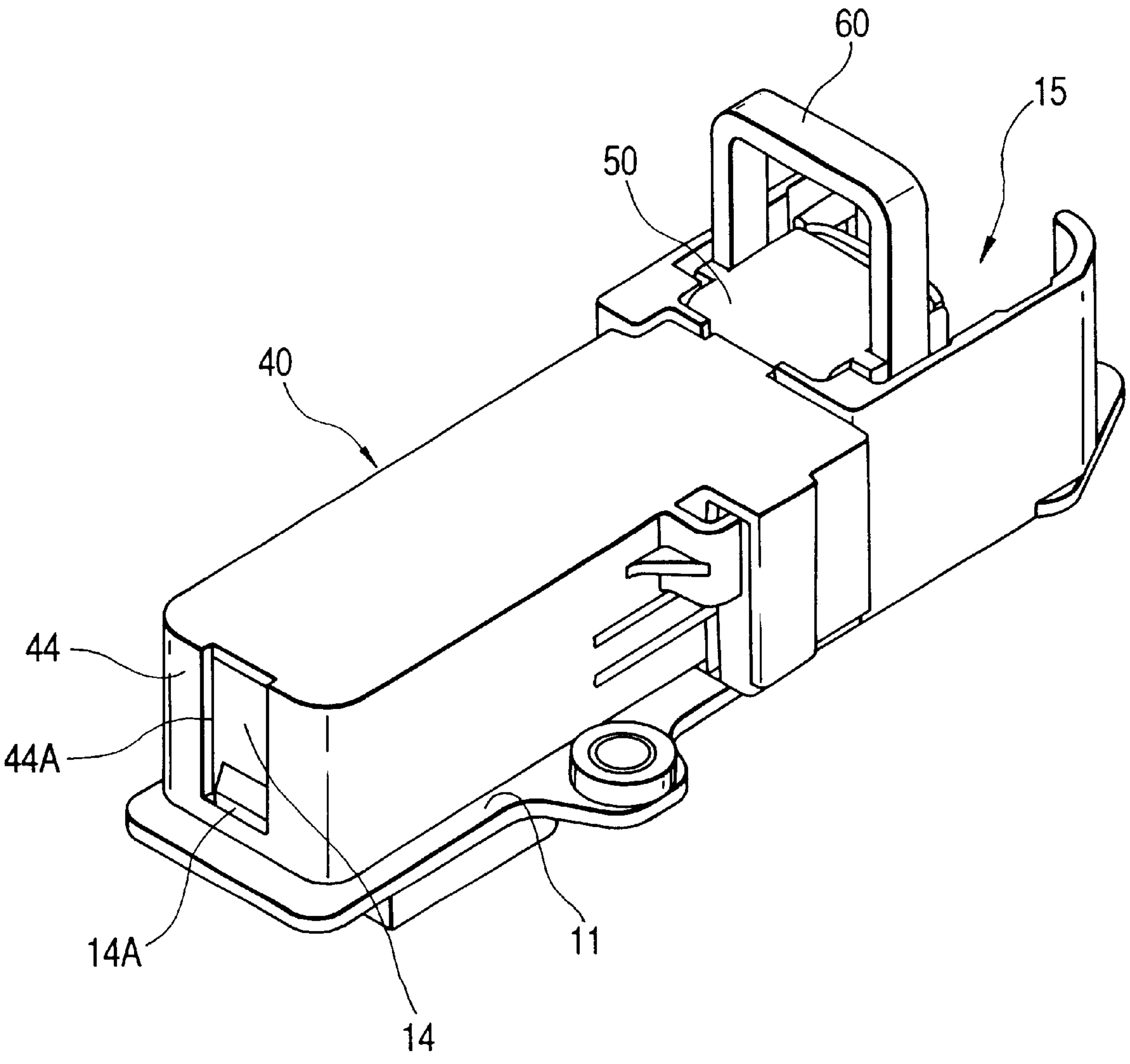
FIG. 3 is a perspective view showing a breaker device in which a plug is inserted into a plug accommodating section.
Figure 9:
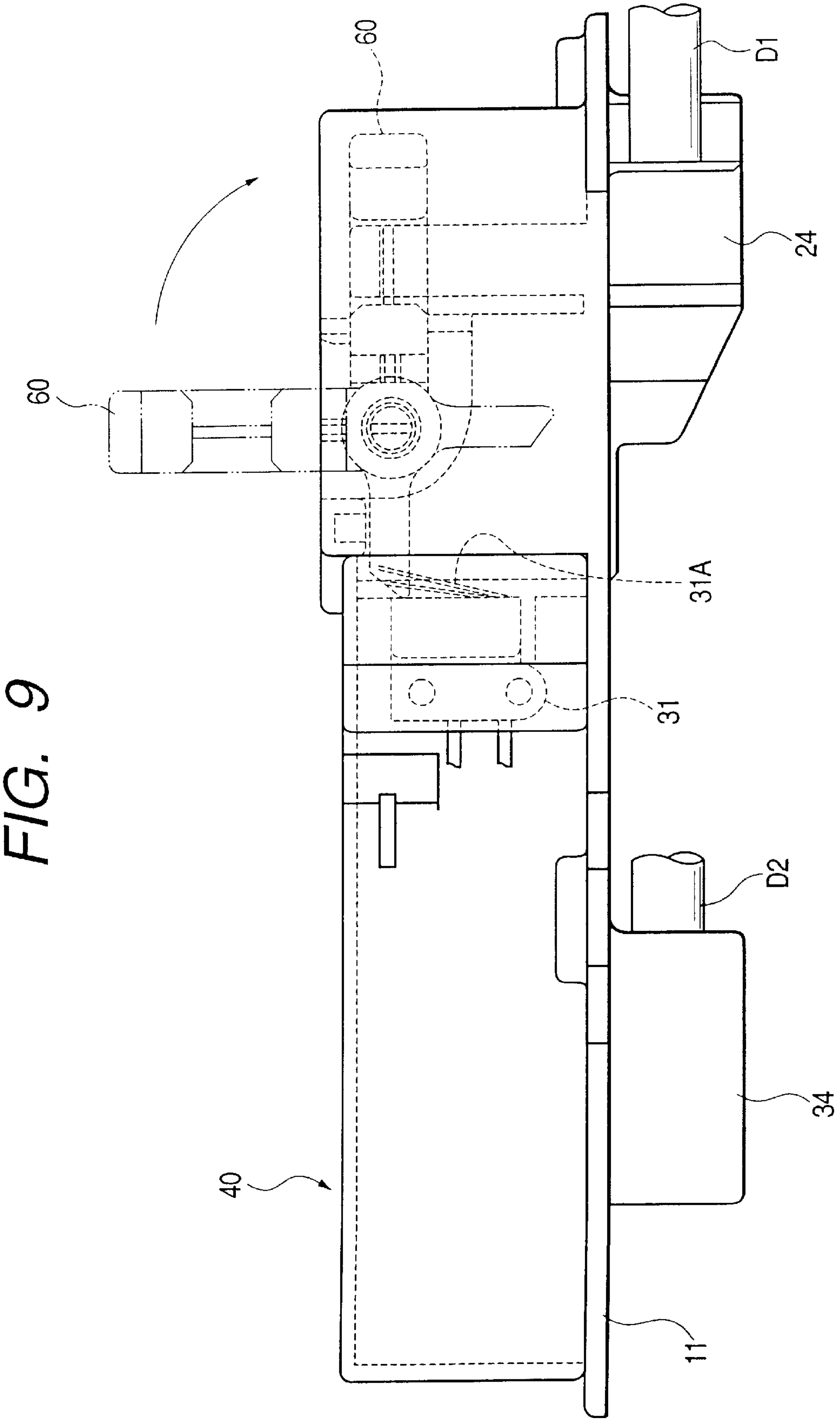
FIG. 9 is a side view of a breaker device.
Figure 10A:
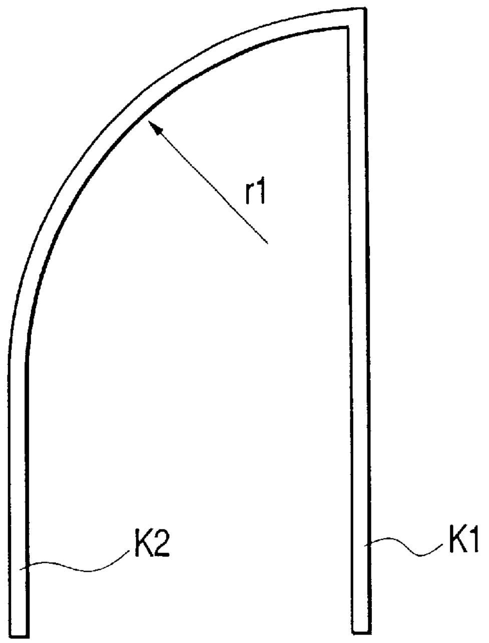
FIG. 10 is a conceptual view for explaining the action and effect.
Figure 10B:
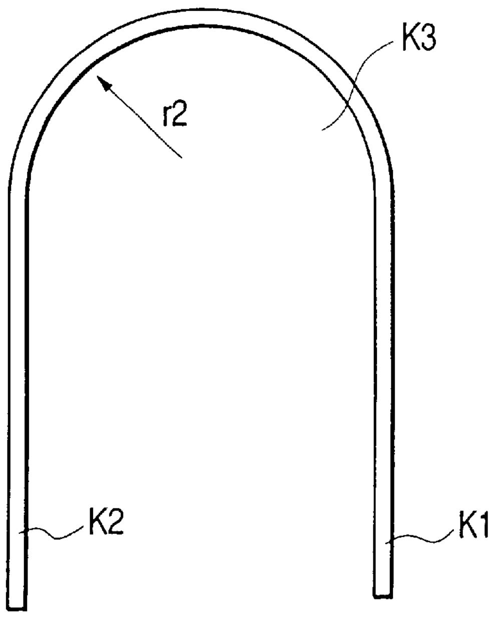

Under the above condition, the plug 50 is pushed inside the plug accommodating section 15 arranged in the breaker body 10 as shown in FIG. 3. In this case, it is enough that the plug 50 is attached at only one place. Therefore, the plug attaching work can be made simpler than that of a conventional case in which the plug 50 is attached at two places. When the plug 50 is pushed inside, the lever 60 is rotated from a rising posture to a horizontal posture as shown in FIG. 9. Then, the rotary end of the arm 61 composing lever 60 on the opposite side to the operating section 62 enters the receiving section 29 provided in the breaker body 10 and engages with it. Further, the operating section 62 side of the arm 61 is engaged with the engaging piece 28 provided in the breaker body 10. Due to the above engagement, the plug 50 can be prevented from coming off, and the arm 61 which has entered one receiving section 29 turns on the microswitch 31, so that a signal expressing that the plug ahs been attached is sent to a predetermined electrical circuit. Further, the restricting protruding piece 46 provided on the cover 40 is engaged with the lower face of the plug 50, so that the cover 40 can be also prevented from coming off.

Figure 8:
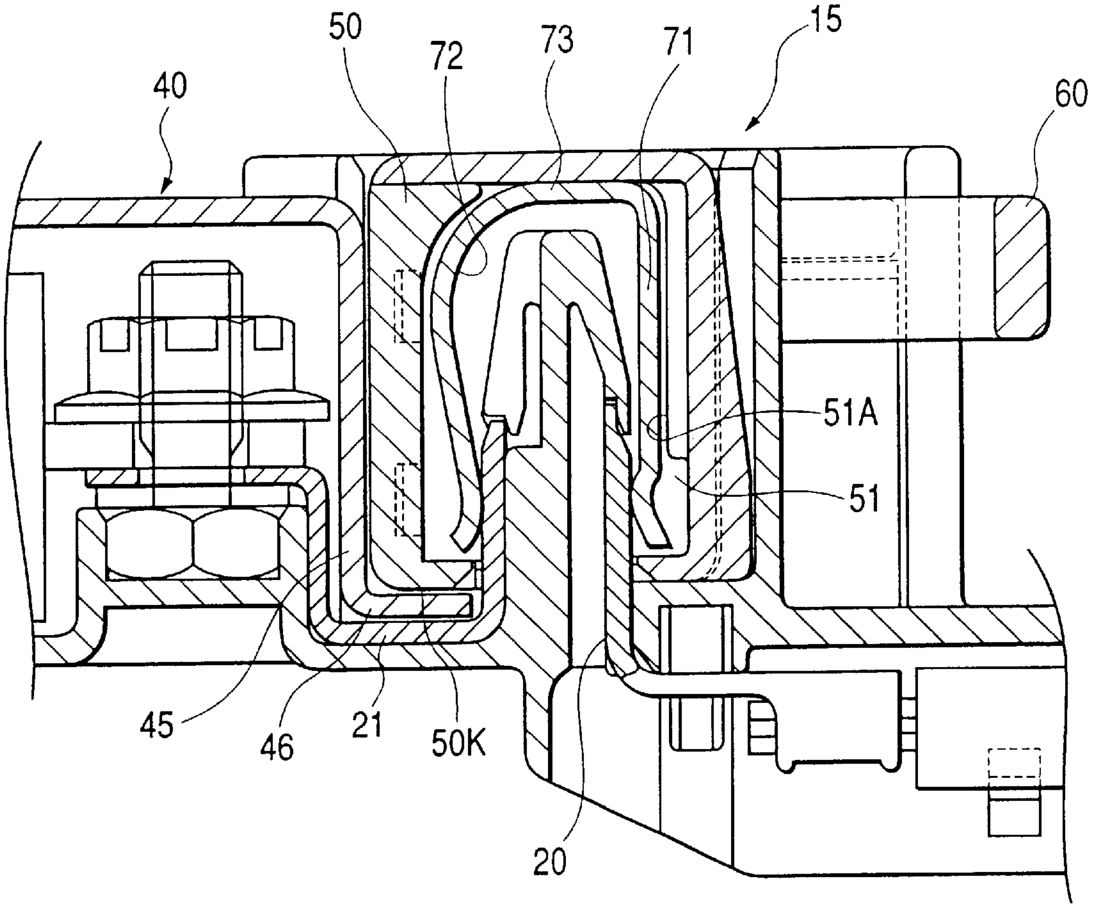
FIG. 8 is a cross-sectional side view showing a state in which a plug is attached to a protruding wall.

When the plug 50 is attached in the plug accommodating section 15, as shown in FIG. 8, the protruding wall 18 is interposed between the first 71 and the second pinching piece 72 of the movable electrode 70 accommodated in the plug 50. Therefore, each pinching piece 71, 72 comes into contact with each stationary electrode 20, 21 arranged on the protruding wall 18. At this time, both the pinching pieces 71, 72 are expanded. In this case, as shown in FIG. 8, the continuity section 73 for connecting the pinching piece 71 with the pinching piece 72 rises from the base end portion of the first pinching piece 71, and the continuity section 73 on the second pinching piece 72 side gently curves and continues to the second pinching piece 72. Compared with the radius of curvature of continuity section K3 of the movable electrode shown in FIG. 10(B) in which pinching pieces K1, K2 are symmetrically connected with each other, the radius of curvature of the continuity section 73 of this embodiment becomes small. Accordingly, concentration of stress caused in the continuity section 73 can be relieved. Due to the foregoing, pinching forces of both the pinching pieces 71, 72 can be increased. Accordingly, the contact pressure between the movable electrode 70 and the stationary electrodes 20, 21 can be ensured sufficiently high. Further, since the first pinching piece 71 extends straight along the inner face 51A (shown in FIG 8) of the recess 51 of the plug 50, it is possible to prevent the first pinching piece 71 from being greatly deformed when it is supported by the inner face 51A, and no plastic deformation is caused at the base end portion of the first pinching piece 71.

In the breaker device of this embodiment, a pair of stationary electrodes 20, 21 are arranged on the front and the rear side of the protruding wall 18, that is, the pair of stationary electrodes 20, 21 are collected at one place. Therefore, the pair of stationary electrodes 20, 21 have a space round both the stationary electrodes in common. Accordingly, the size of the breaker device can be reduced. Further, when the radius of curvature of the continuity section 73 connecting the pinching pieces 71, 72 is made large, concentration of stress can be relieved. Therefore, the pinching forces of both the pinching pieces 71, 72 can be increased. Accordingly, it is possible to ensure a sufficiently high contact pressure between the movable electrode 70 and the stationary electrodes 20, 21.

It should be noted that the present invention is not limited to the above specific embodiment. For example, the following embodiments are included in the technical scope of the present invention. Further, variations may be made without departing from the spirit and scope of the invention.

(1) The breaker device of the above embodiment accommodates the fuse 35 in it, however, it is possible to apply the present invention to a breaker device having no fuse.

(2) In the above embodiment, the lever 60 is pivotally attached to the plug 50, however, it is possible to apply the present invention to a breaker device in which no lever is attached to the plug, for example, it is possible to apply the present invention to a breaker device in which a hook to be operated by an operator's finger is provided.

Second Embodiment

The second embodiment of the invention will be described below.

The structures of the breaker device of this embodiment is the same as those of the breaker device described in the first Embodiment. The action of the breaker device will be explained below.

This breaker device is attached to an electric automobile in the following manner. A portion of the power cable of the electric automobile is attached to the breaker body 10 as electrical wires D1, D2, and the breaker body 10 is fixed at a predetermined position of the electric automobile when a bolt is inserted into the attaching hole 11A (shown in FIG. 5) formed in the base section 11.

Next, the cover 40 is attached to the fuse accommodating section 16 of the breaker body 10. The cover 40 is pressed so that the long wall 43 and the short wall 44 can be respectively engaged with the outside of the long wall 13 and the short wall 14 of the breaker body 10. When the cover 40 is pressed, the engaging hole 44A formed on the short wall 44 of the cover 40 is engaged with the engaging protrusion 14A formed on the short wall 14 of the breaker body 10 (shown in FIG. 3). At this moment, the vertical wall 45 provided on the cover 40 is inserted between a pair of partition walls 17, 17 arranged at one end of the fuse accommodating section 16. Further, the restricting protruding piece 46 is set at a position close to the rising portion of the protruding wall 18 of the base section 11 of the breaker body 10 (shown in FIG. 7).

Under the above condition, the plug 50 is pushed inside the plug accommodating section 15 arranged in the breaker body 10 as shown in FIG. 3. In this case, it is enough that the plug 50 is attached at only one place. Therefore, the plug attaching work can be made simpler than that of a conventional case in which the plug 50 is attached at two places. When the plug 50 is pushed inside, the lever 60 is rotated from a rising posture to a horizontal posture as shown in FIG. 9. Then, the rotary end of the arm 61 composing lever 60 on the opposite side to the operating section 62 enters the receiving section 29 provided in the breaker body 10 and engages with it. Further, the operating section 62 side of the arm 61 is engaged with the engaging piece 28 provided in the breaker body 10. When the plug 50 is attached, the restricting protruding piece 46 arranged on the cover 40 is engaged with the lower face 50K (shown in FIG. 8) of the plug 50. Accordingly, the cover 40 is engaged with the plug 50 (the engaging face 50 is engaged with the restricting protruding piece 46), and also the cover 40 is engaged with the breaker body 10 (the engaging protrusion 14A is engaged with the engaging hole 44A), so that both end portions are engaged in such a manner that they can not be pulled out. Therefore, it is possible to prevent the cover 40 from being obliquely disconnected.

In this connection, when the lever 60 is rotated, an end portion of the lever 60 enters one receiving section 29 and turns on the microswitch 31 (shown in FIG. 9), and a signal expressing that the plug 50 has been attached is sent to a predetermined electrical circuit.

When the plug 50 is set in the plug accommodating section 15, in the plug 50, the protruding wall 18 is interposed between the first pinching piece 71 and the second pinching piece 72 of the movable electrode 70 as shown in FIG. 8, and each pinching piece 71, 72 comes into contact with each stationary electrode 20, 21 arranged on the protruding wall 18. Due to the foregoing, both the stationary electrodes 20, 21 are electrically communicated with each other, and an electrical current flows in the fuse 35.

In this connection, the fuse 35 is replaced in the following manner. First, the plug 50 is drawn out from the plug accommodating section 15. Then, the cover 40 is disconnected from the breaker body 10. Then, an upper face of the fuse accommodating section 16 is opened. Therefore, nut N for fixing the fuse 35 is removed, and the fuse 35 is replaced with a new fuse 35. At this time, the plug 50 is disconnected, and no electrical current flows in the fuse 35. Therefore, the fuse can be safely replaced.

In this connection, when a worker makes a mistake in the aforementioned procedure and is going to replace the fuse 35 while the plug 50 is being set in the breaker device, operation is conducted as follows. When the cover 40 is going to be disengaged while the plug 50 is set in breaker device, the restricting protruding piece 46 arranged on the cover 40 comes into contact with the lower face 50K of the plug 50, and it is impossible to move the cover 40 in the disconnecting direction. At this point of time, the worker realizes that the plug 50 must be first drawn out in order to replace the fuse 35. Therefore, the worker necessarily follows the predetermined procedure so as to replace the fuse 35. The restricting protruding piece 46 of this embodiment is engaged with the lower face 50K on the forward end side in the attaching direction of the plug 50. Therefore, even when the plug 50 is halfway disconnected from the protruding wall 18, the restricting protruding piece 46 still engages with the lower face 50K of the plug 50, and the cover 40 can not be disconnected from the fuse accommodating section 16. That is, unless the plug 50 is completely disconnected and the fuse 35 is set in a state of complete non-continuity, the cover 40 can not be disconnected from the breaker body 10. Therefore, it is possible to prevent the occurrence of fuse replacement in which the fuse is replaced in a state of electrical continuity.

In the breaker device of this embodiment, a pair of stationary electrodes 20, 21 are arranged on the front and the rear side of the protruding wall 18, that is, the pair of stationary electrodes 20, 21 are collected at one place. Therefore, the pair of stationary electrodes 20, 21 have a space round both the stationary electrodes in common. Accordingly, the size of the breaker device can be reduced. When the plug 50 is attached to the protruding wall 18, the restricting protruding piece 46 arranged on the cover 40 which covers the fuse accommodating section 16 is engaged with the lower face 50K of the plug 50. In other words, unless the plug 50 is drawn out, the cover 40 can not be disconnected. Therefore, when the fuse is replaced, the plug 50 is necessarily disconnected, and a state of non-continuity can be obtained. Due to the foregoing, the fuse can be safely and smoothly replaced.

It should be noted that the present invention is not limited to the above specific embodiment. For example, the following embodiments are included in the technical scope of the present invention. Further, variations may be made without departing from the spirit and scope of the invention.

(1) In the above embodiment, the cover movement restricting section (restricting protruding piece 46) is formed into a shape of protrusion and engaged with the lower face 50K of the plug 50. However, it is possible to adopt the following arrangement. For example, the cover movement restricting section is composed of a lock arm extending along the side of the plug. When the plug is accommodated in the plug accommodating section, the lock arm is bent, and the lock protrusion provided at the end is engaged with the engaging hole provided on the side of the plug.

The ceiling wall of the plug 50 may be extended to the side of the cover 40, and a lower face of the extending portion may be engaged with an upper face of the cover 40. In this case, the upper face of the cover 40 composes the cover movement restricting section of the present invention.

Third Embodiment

A third Embodiment of the invention will be described below with reference to the drawings. The main feature of this embodiment is a pair of protection walls 26 as shown in FIGS. 6B and 11–15. The other structures are the same as those of the first embodiment.

Figure 6B:
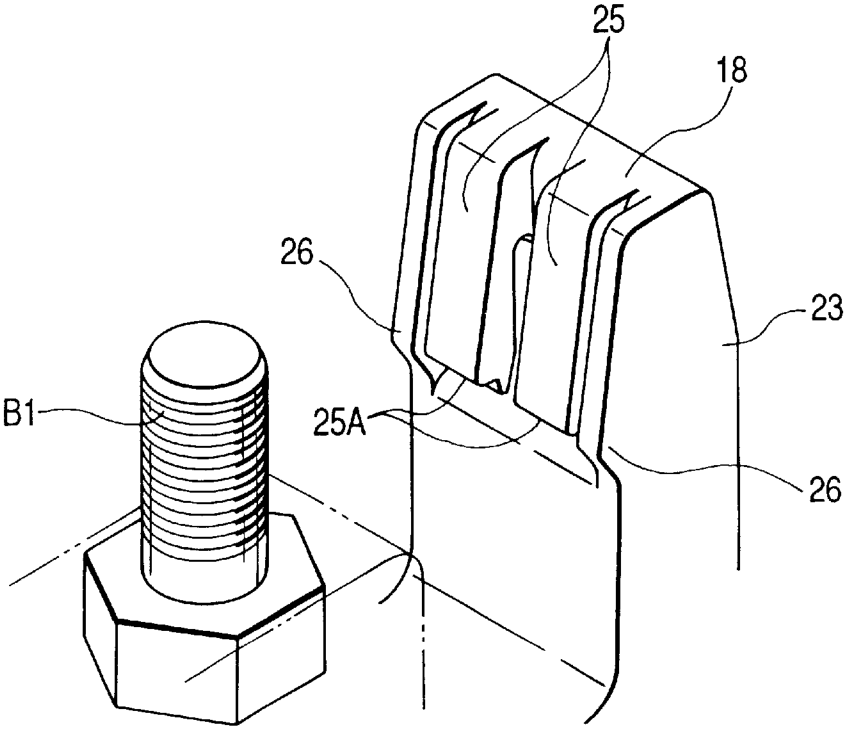
Figure 11:
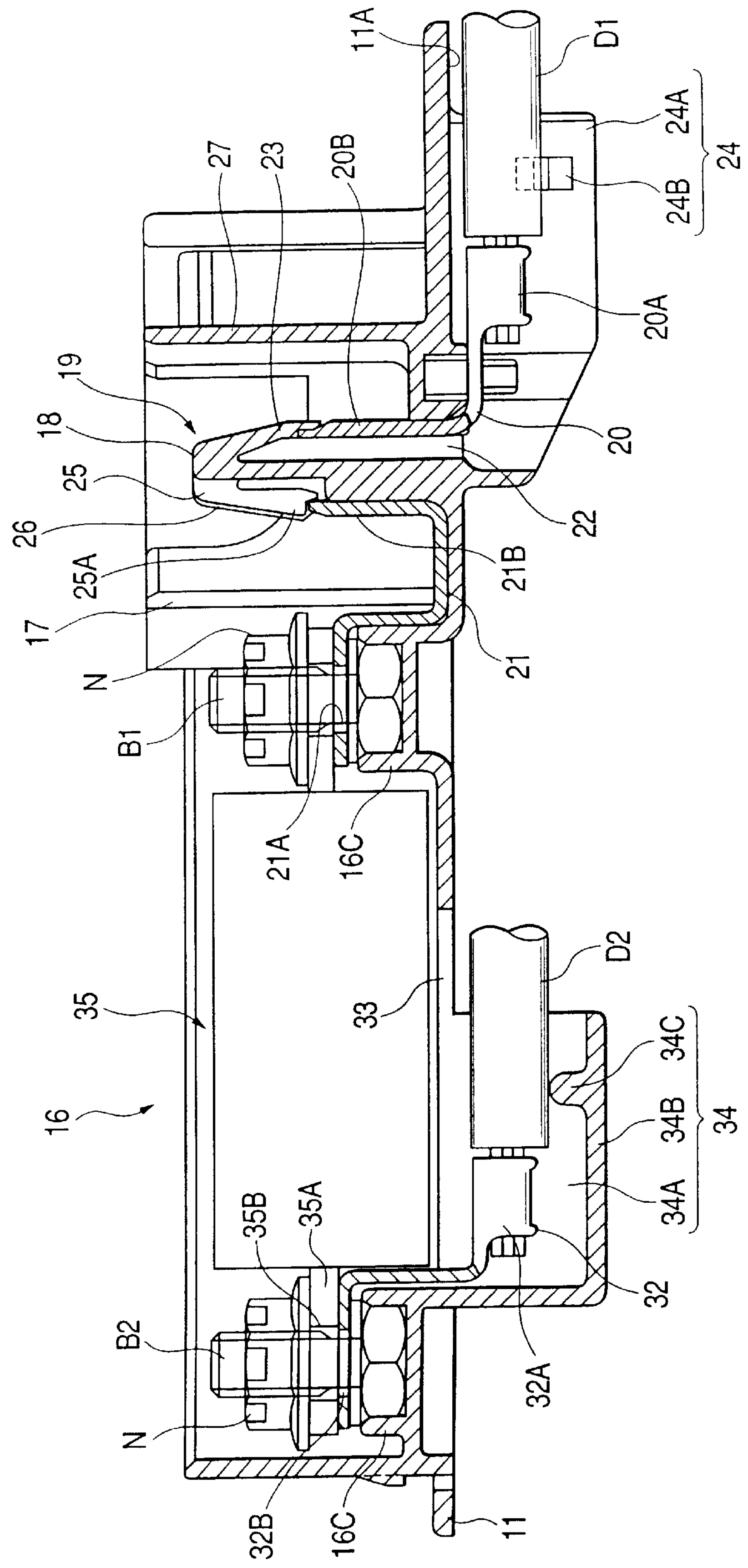
FIG. 11 is a cross-sectional side view showing a breaker body.
Figure 12:
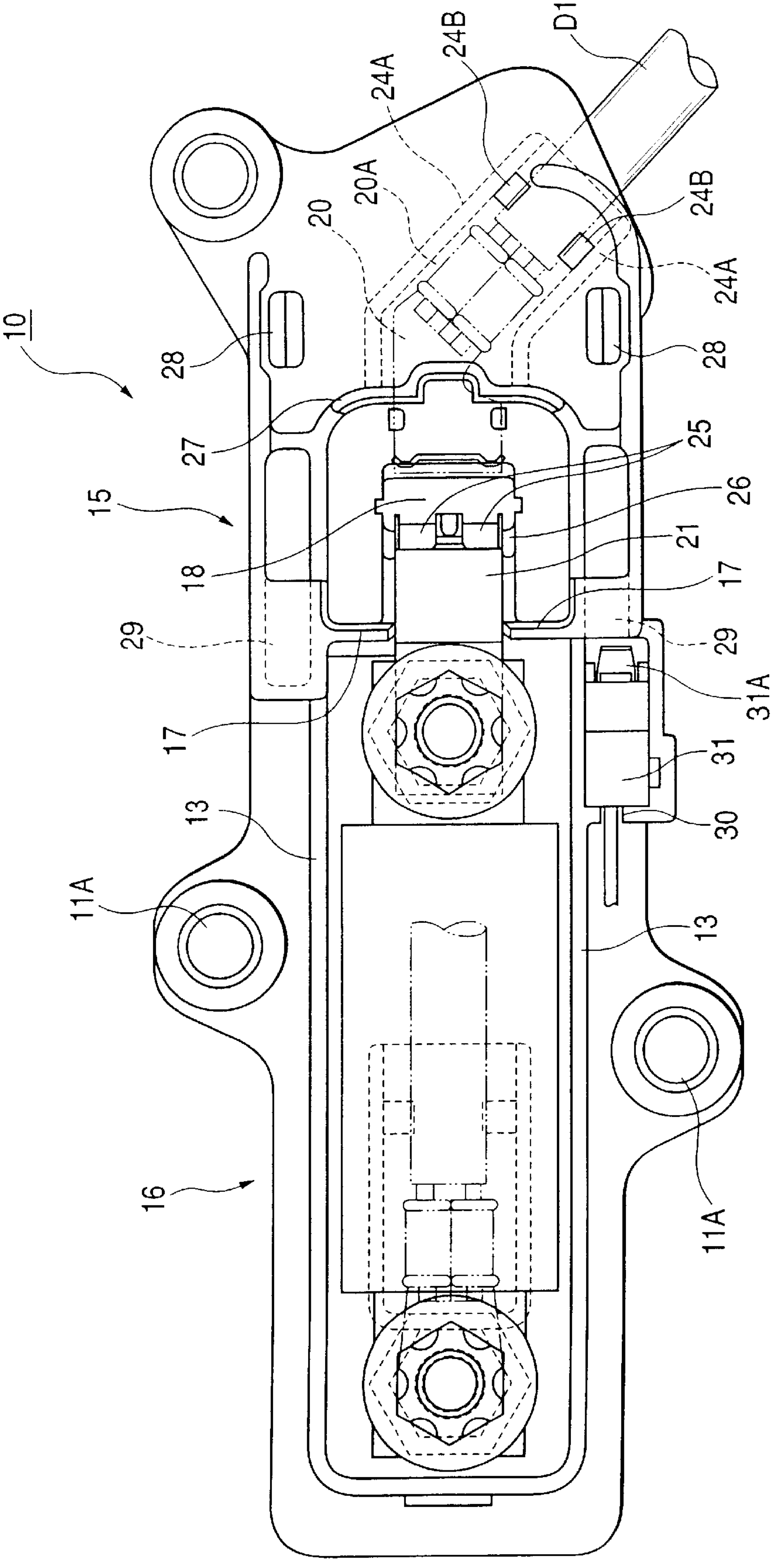
FIG. 12 is a plan view showing a breaker body.

As shown in FIGS. 6B, at the forward end side of the reverse face of the protruding wall 18, there are provided a pair of lances 25, 25 for preventing the second stationary electrode 21 from coming off. On both sides of the protruding wall 18, there are provided a pair of protection walls 26, 26 which are adjacent to the lances 25 and raised higher than the lances 25. These lances 25, 25 are formed into a cantilever-shape and rise from the forward end portion of the protruding wall 18 and extend downward in parallel with each other, and the forward end portion of the second stationary electrode 21 is butted against the lower face of the engaging section 25A provided in the lower end portion as shown in FIG. 11. As shown in FIG. 12, the lances 25, 25 are arranged at an interval. Due to the foregoing, the lances 25, 25 are butted against both sides of the end of the second stationary electrode 21, and they can be stably prevented from coming off, and as compared with a case in which one wise lance is provided, the lance deformation reaction force can be suppressed.

The second stationary electrode 21 is incorporated as follows. The second stationary electrode 21 is pushed between the partition wall 17 and the protruding wall 18 from the U-shaped bottom side, and bolt B1 described later provided in the fuse accommodating section 16 is inserted into the bolt insertion hole 21A.

This assembling work is described in detail as follows. When the second stationary electrode 21 is pushed into, the forward end contact section 21B provided in the second stationary electrode 21 is moved along the reverse side of the protruding wall 18. At this time, the forward end contact section 21B moves between both the lance protection walls 26, 26 on the protruding wall 18 and gets on the lances 25, 25 in the middle of movement. When the second stationary electrode 21 is pushed into in the above condition, the lances 25, 25 are pushed and bent so that they approach the protruding wall 18. Therefore, the lances 25, 25 are retracted from the movement path of the second stationary electrode 21. As described before, compared with a case in which one wide lance is provided, the lance deformation reaction force of the lances 25, 25 can be suppressed. Therefore, the assembling work can be easily carried out. When the second stationary electrode 21 is set at a normal position, the forward end contact section 21B of the second stationary electrode 21 is laid on the base end side on the reverse side of the protruding wall 18, and the lances 25 are restored, so that the second stationary electrode 21 can be engaged being prevented from coming off.

In the plug accommodating section 15, at a position more distant from the partition wall 17 than the protruding wall 18, as shown in FIG. 1, the end wall 27 rises from the base section 11. The plug 50 described later is attached to the forward end of the protrusion 18 being guided by this end wall 27.

Figure 13:
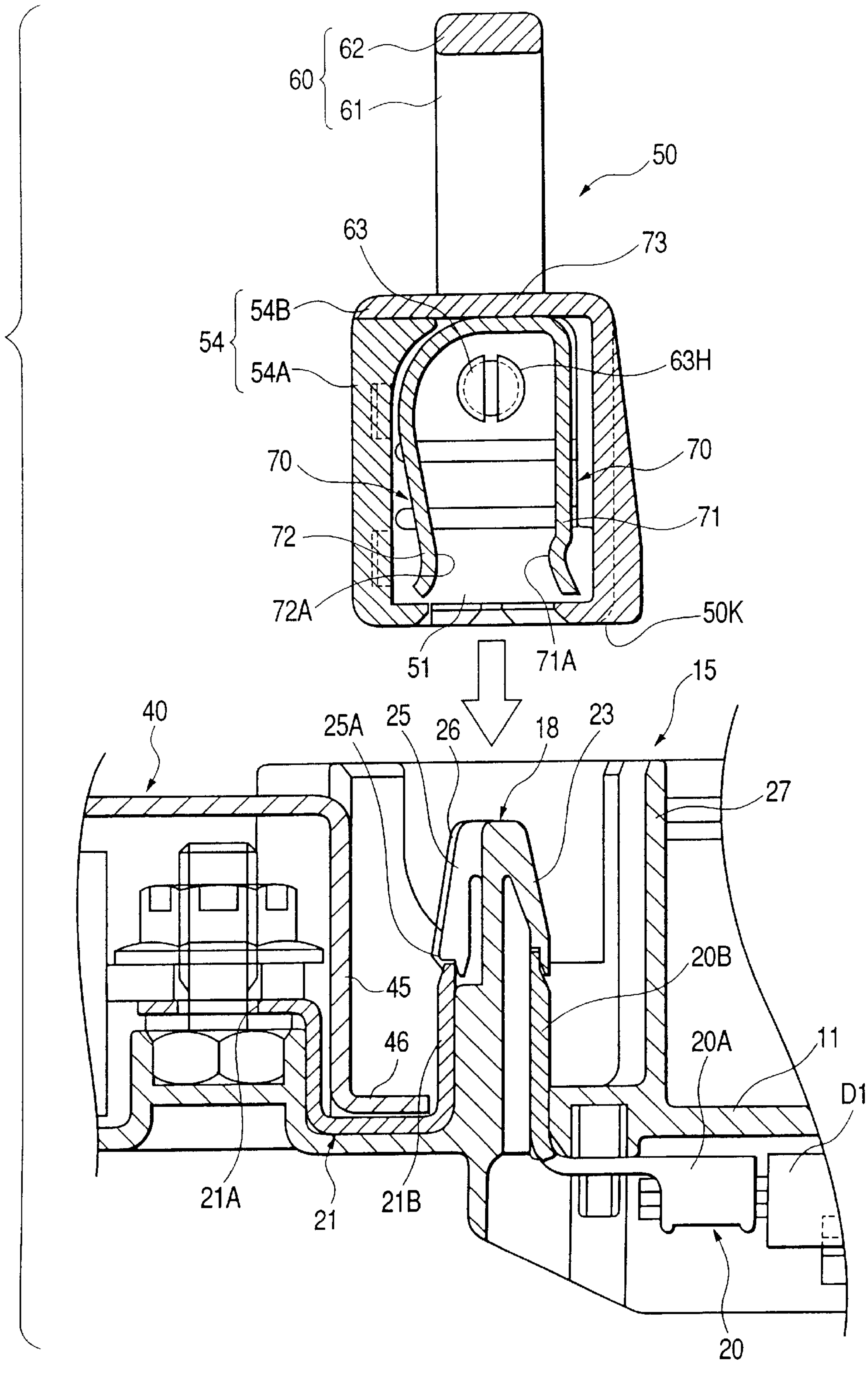
FIG. 13 is a cross-sectional side view showing a state before a plug is attached to a protruding wall.

In the third embodiment, as shown in FIG. 13, the movable electrode 70 is composed in such a manner that the first 71 and the second leg piece 72, which respectively come into contact with the stationary electrodes 20, 21 while the protruding wall 18 is interposed between the first 71 and the second leg piece 72, are connected with each other by continuity section 73. At the lower end portions of both leg pieces 71, 72, the contacts 71A, 72A are protruded so that they can approach each other. The width of the movable electrode 70 is set wider than the interval between both the lance protection walls 26, 26.

The action of the breaker device will be explained below. This breaker device is attached to an electric automobile in the following manner. A portion of the power cable of the electric automobile is attached to the breaker body 10 as electrical wires D1, D2, and the breaker body 10 is fixed at a predetermined position of the electric automobile when a bolt is inserted into the attaching hole 11A (shown in FIG. 12) formed in the base section.

Next, the cover 40 is attached to the fuse accommodating section 16 of the breaker body 10. The cover 40 is pressed so that the long wall 43 and the short wall 44 can be respectively engaged with the outside of the long wall 13 and the short wall 14 of the breaker body 10. When the cover 40 is pressed, the engaging hole 44A formed on the short wall 44 of the cover 40 is engaged with the engaging protrusion 14A formed on the short wall 14 of the breaker body 10 as shown in FIG. 3. At this moment, the vertical wall 45 provided on the cover 40 is inserted between a pair of partition walls 17, 17 arranged at one end of the fuse accommodating section 16. Further, the restricting protruding piece 46 is set at a position close to the rising portion of the protruding wall 18 of the base section 11 of the breaker body 10 as shown in FIG. 13.

Figure 14:
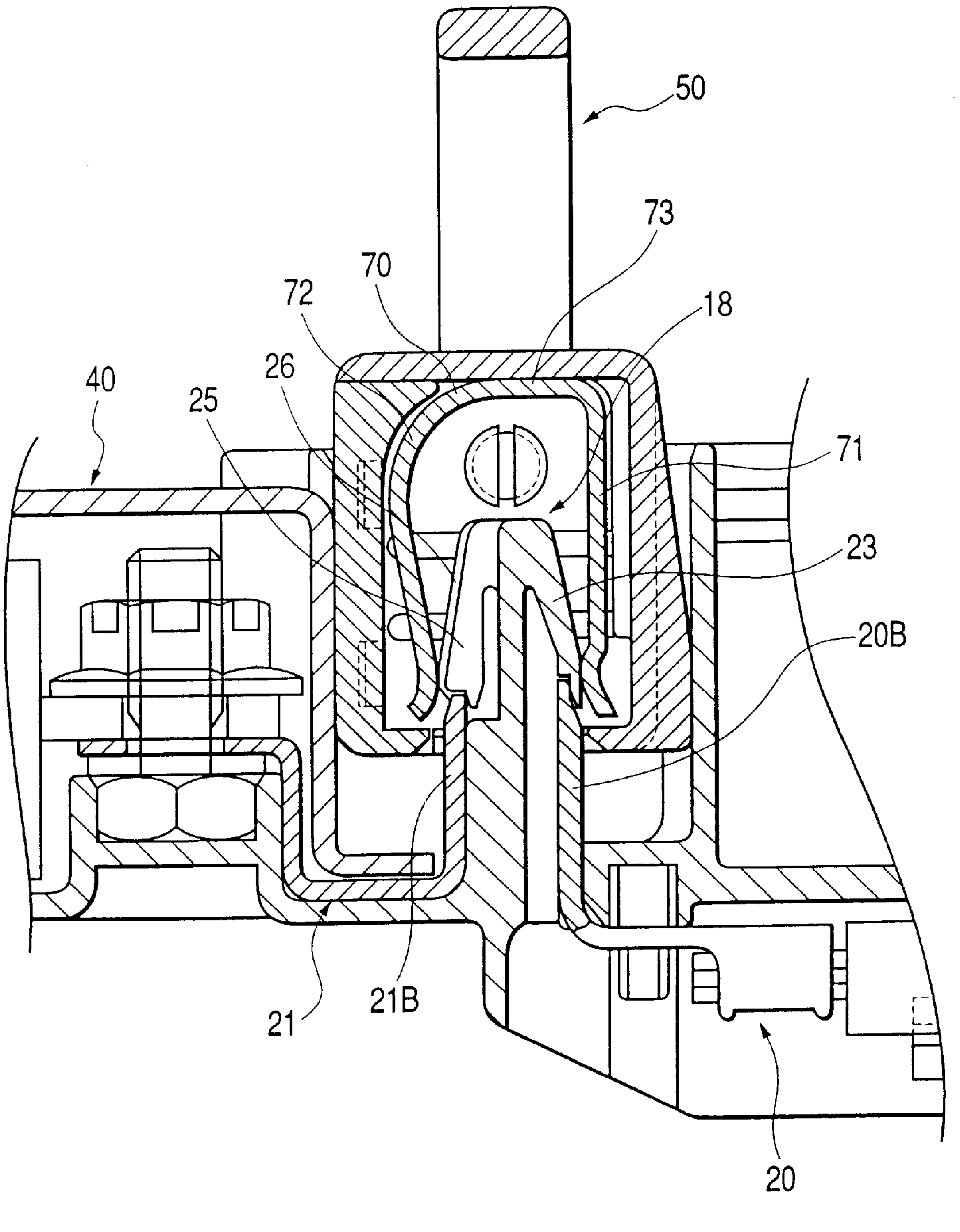
FIG. 14 is a cross-sectional side view showing a state in which a plug is attached to a protruding wall.
Figure 15:
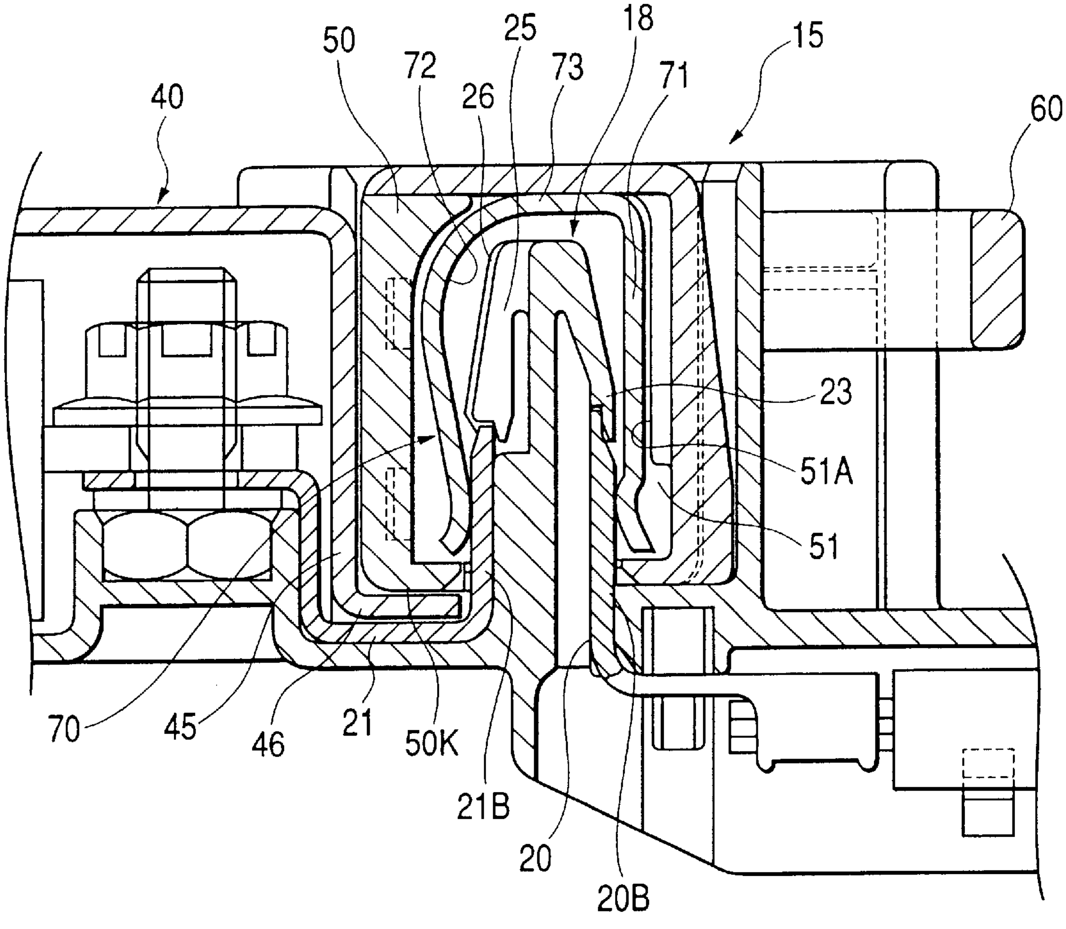
FIG. 15 is a cross-sectional side view showing a state in which a plug is attached to a protruding wall.
Figure 16:
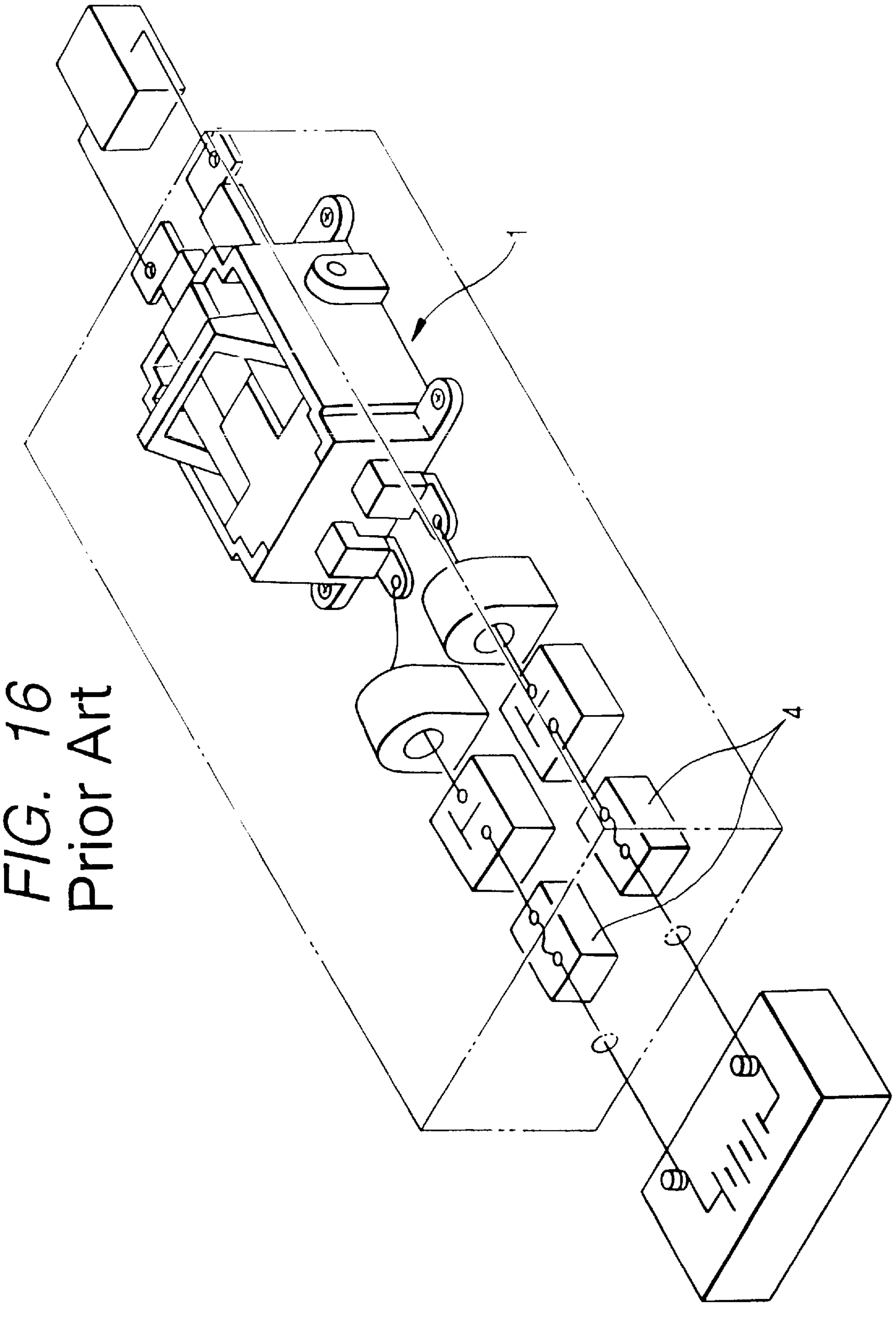
FIG. 16 Prior Art
FIG. 16 is a perspective view showing a conventional breaker.
Figure 17:
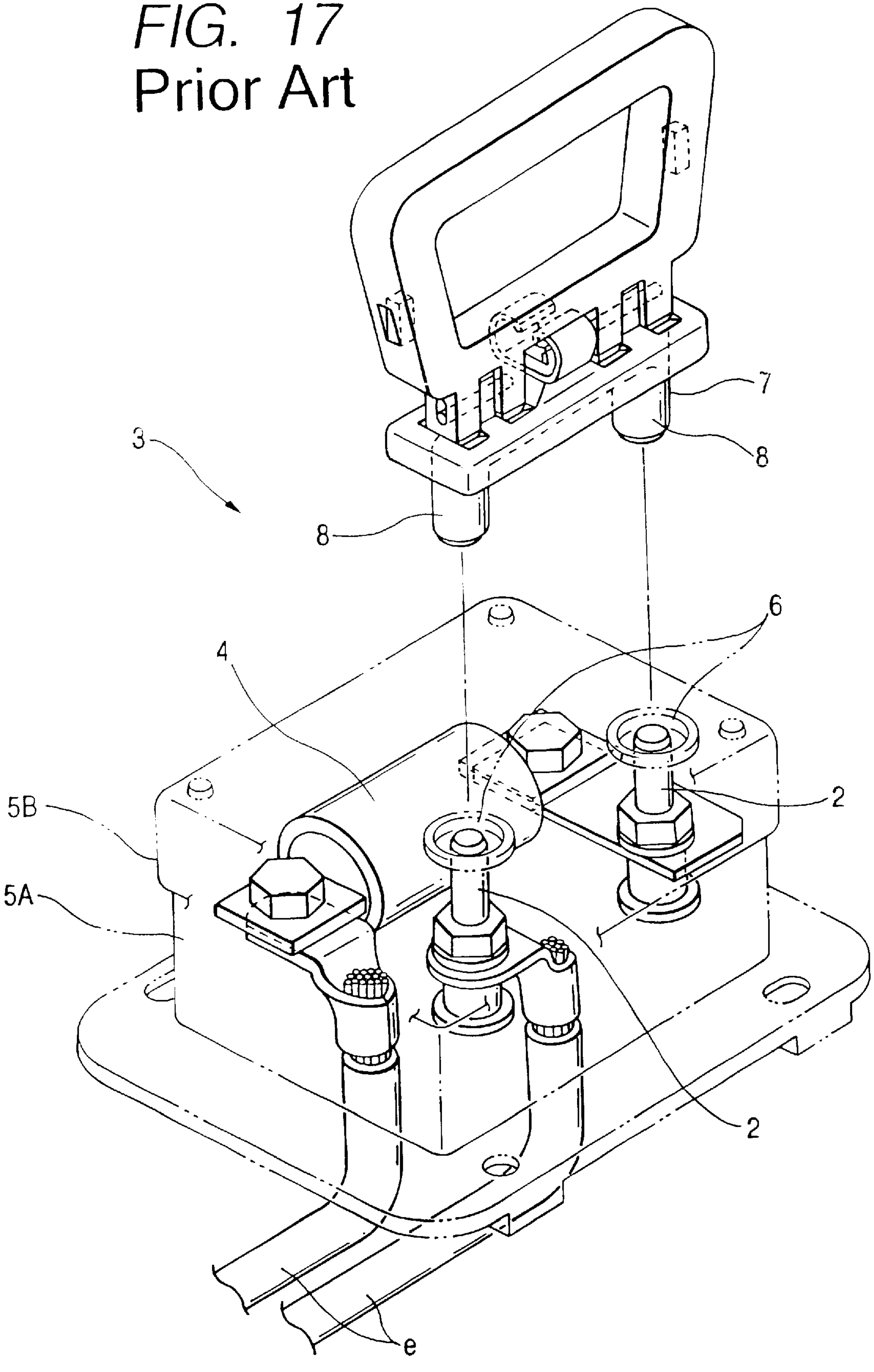
FIG. 17 Prior Art
FIG. 17 is a perspective view showing another conventional breaker.

Under the above condition, the plug 50 is attached to the plug accommodating section 15 provided in the breaker body 10. Particularly, this attaching operation is conducted as follows. The opening of the recess 51 of the plug 50 is directed to the forward end of the protruding wall 18, and the forward end of the protruding wall 18 is set between a pair of leg pieces 71, 72 of the movable electrode 70, and the plug is pressed as it is. Then, as shown in FIG. 14, one leg piece 71 gets on the protrusion 23 provided on the front side of the protruding wall 18, and the other leg piece 72 gets on the lance protection walls 26, 26 on the reverse side of the protruding wall 18. In this case, the lance protection walls 26, 26 protrude to the side from the protruding wall 18 higher than the lance 25. Therefore, the leg piece 72 does not come into contact with the lance 25. Further, the pair of lance protection walls 26 support the leg piece 72 in such a manner that both end portions of the leg piece 72 are supported. Therefore, the leg piece 72 can be positively separated from the lance 25, and the lance 25 can be positively prevented from being pushed by the leg piece 72.

When the plug 50 is pushed inside, both the leg pieces 71, 72 are restored, and the contacts 71A, 72A provided at the lower end portions of these leg pieces respectively come into contact with the stationary electrodes 20, 21, so that both the stationary electrodes 20, 21 are electrically continued to each other.

Next, as shown in FIG. 9, the lever 60 provided with the plug 50 is rotated from a rising posture to a horizontal posture, and the operating section 62 side of the lever 60 is engaged with the engaging piece 28 provided in the breaker body 10. In this way, the assembling work of the plug 50 is completed.

In order to disconnect the plug 50 from the breaker body 10, the lever 60 is rotated from a horizontal posture to a rising posture, and the plug 50 is pulled out. In this case, the leg pieces 72 are opened by the lance protection wall 26. Therefore, the leg piece 72 are pulled out while they are not contacted with the lance 25.

As described above, in the breaker device of this embodiment, the pair of stationary electrodes 20, 21 are arranged on the front and the rear side of the protruding wall 18, that is, the pair of stationary electrodes 20, 21 are collected at one place. Therefore, the pair of stationary electrodes 20, 21 have a space round both the stationary electrodes in common. Since the second stationary electrode 21 is prevented by the lance 25 from being pulled out, there is no possibility that the second stationary electrode 21 is pulled out upward by a frictional force generated in the case of pulling out the movable electrode 70. Further, when the second stationary electrode 21 is incorporated being moved from the upper end side to the base end side of the protruding wall 18, the lance 25 is pushed in the middle of movement and retracted from the movement path of the second stationary electrode 21. Therefore, the second stationary electrode 21 can be easily incorporated without being obstructed by the lance 25. Further, when the movable electrode 70 is attached, the lower end portions of the leg pieces 72 provided in the movable electrode 70 are opened by the lance protection wall 26 provided adjacent to the lance 25 so that the leg pieces 72 can not be contacted with the lance 25. Accordingly, no lance 25 is deformed when the movable electrode 70 is attached, and the second stationary electrode 21 can be stably held.

It should be noted that the present invention is not limited to the above specific embodiment. For example, the following embodiments are included in the technical scope of the present invention. Further, variations may be made without departing from the spirit and scope of the invention.

(1) The breaker device of the above embodiment accommodates the fuse 35 in it, however, it is possible to apply the present invention to a breaker device having no fuse.

(2) In the above embodiment, there are respectively provided two lances 25 and two lance protection walls 26. However, the present invention is not limited to the above specific embodiment, for example, one lance protection wall may be provided on the side of one lance.

What is claimed is:

1. A breaker device comprising:

a pair of sheet-shaped stationary electrodes arranged on a front and a rear side of a protruding wall rising from a breaker body;

a recess-shaped plug to be attached to the protruding wall; and a movable electrode arranged in a recess of the plug into which the protruding wall proceeds, the movable electrode including a first and a second pinching piece respectively coming into contact with the stationary electrodes, the base end portions of which are connected with each other by a continuity section, wherein the continuity section rises from the base end portion of the first pinching piece toward the second pinching piece, and the continuity section on the second pinching piece side is gently curved so that it continues to the second pinching piece.

2. The breaker device according to claim 1, wherein the recess in the plug is formed in such a manner that the inside of the recess is larger than the opening, end portion of the first and the second pinching piece of the moveable electrode come into contact with the opening edge of the recess when the first and the second pinching piece are in the natural condition so that the movable electrode can not be drawn out from the recess.

3. A breaker device according to claim 2, wherein a portion of the peripheral wall of the recess of the plug is formed and incorporated into the peripheral wall differently from other portions of the peripheral wall, and the movable electrode is capable of being accommodated into the recess from a portion into which the portion of the peripheral wall is incorporated.

4. A breaker device according to claim 1, wherein a portion of the peripheral wall of the recess of the plug is formed and incorporated into the peripheral wall differently from other portions of the peripheral wall, and the movable electrode is capable of being accommodated into the recess from a portion into which the portion of the peripheral wall is incorporated.

5. A breaker device comprising:

a protruding wall rising from a base section of a breaker body;

a pair of sheet-shaped stationary electrodes arranged on a front and a rear side of the protruding wall;

a recess-shaped plug to be attached to the protruding wall;

a U-shaped movable electrode accommodated in the plug, electrically communicating both the stationary electrodes by pinching the protruding wall from the front and the reverse face;

a fuse accommodating section arranged inside a surrounding wall rising from the base section in parallel with the protruding wall, accommodating a fuse connected with one of the stationary electrodes;

a cover covering an open face of the fuse accommodating section, capable of being engaged with the a surrounding wall;

an engaging face formed in the plug, directed to the front of the attaching direction of the plug; and a cover movement restricting section provided on the cover, engaged with the engaging face of the plug under the condition that the cover is engaged with the protruding wall.

6. A breaker device according to claim 5, wherein the engaging face is arranged on the forward end side of the attaching direction of the plug, the cover movement restricting section is arranged at a lower end of a vertical wall extending downward along a side of the plug from a ceiling portion of the cover, and the cover movement restricting section is formed into a protruding piece protruding from the lower end of the vertical wall so that the cover movement restricting section is arranged along the engaging face of the plug.

7. A breaker device according to claim 5, wherein an engaging section to be engaged with the surrounding wall so as to restrict the cover from being disengaged is provided on the cover on a side distant from the plug.

8. A breaker device comprising:

a pair of sheet-shaped stationary electrodes arranged on a front and a rear side of a protruding wall rising from a breaker body;

a portal-shaped movable electrode capable of short-circuiting the stationary electrodes, wherein when the movable electrode is attached to the protruding wall, lower end portions of a pair of leg pieces provided in the movable electrode, an interval of which is shortened, respectively come into contact with the stationary electrodes so that both the stationary electrodes can be changed over from a state of non-continuity to a state of continuity, wherein the protruding wall includes:

a lance extending downward from an upper end of the protruding wall in a cantilever-shape and preventing the stationary electrode from coming off when the lance is butted against a forward end face of the stationary electrode; and at least one lance protection wall arranged adjacent to the lance on the protruding wall, for opening the leg pieces so that the leg pieces can not be contacted with the lance when the lower end portions of the leg pieces are passing by the upper end of the protruding wall.

9. The breaker device according to claim 8, wherein the at least one lance protection wall comprises a pair of lance protection walls, and the lance is disposed between the lance protection walls.

* * * * *